United States Patent
Nishii et al.

(10) Patent No.: US 12,487,608 B2
(45) Date of Patent: Dec. 2, 2025

(54) ROUTE GENERATION METHOD, ROUTE GENERATION SYSTEM, AND ROUTE GENERATION PROGRAM

(71) Applicant: Yanmar Holdings Co., Ltd., Osaka (JP)

(72) Inventors: Yasuto Nishii, Okayama (JP); Masaaki Murayama, Okayama (JP); Hidetaka Suzuki, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 146 days.

(21) Appl. No.: 18/218,488

(22) Filed: Jul. 5, 2023

(65) Prior Publication Data
US 2024/0012414 A1    Jan. 11, 2024

(30) Foreign Application Priority Data
Jul. 6, 2022    (JP) .................. 2022-108943

(51) Int. Cl.
G05D 1/229    (2024.01)
A01B 69/04    (2006.01)
G01C 21/20    (2006.01)

(52) U.S. Cl.
CPC ......... *G05D 1/2297* (2024.01); *A01B 69/008* (2013.01); *G01C 21/20* (2013.01)

(58) Field of Classification Search
None
See application file for complete search history.

(56) References Cited

U.S. PATENT DOCUMENTS

| | | |
|---|---|---|
| 2021/0278855 A1 | 9/2021 | Sakai |
| 2022/0400597 A1* | 12/2022 | Tamatani ............... B60P 3/064 |
| 2024/0012414 A1 | 1/2024 | Nishii et al. |

FOREIGN PATENT DOCUMENTS

| | | | |
|---|---|---|---|
| JP | 2019-166981 A | 10/2019 | |
| JP | 2021029218 A | 3/2021 | |
| JP | 2023079152 A * | 6/2023 | ........... A01B 69/008 |

OTHER PUBLICATIONS

Translation of JP-2023079152 (Year: 2021).*
Extended European Search Report dated Nov. 7, 2023 issued in EP Application No. 23180310.7.

* cited by examiner

*Primary Examiner* — Peter D Nolan
*Assistant Examiner* — Michael F Whalen
(74) *Attorney, Agent, or Firm* — NORTON ROSE FULBRIGHT US LLP

(57) ABSTRACT

A reception processing unit receives a traveling operation performed by an operator. An acquisition processing unit acquires position information of a work vehicle traveling on a road that connects a field and a field, based on the traveling operation. A generation processing unit generates an inter-field route on which the work vehicle is caused to automatically travel between the field and the field, based on the position information.

15 Claims, 26 Drawing Sheets

| ROUTE ID | START FIELD | END FIELD | POSITION INFORMATION | SPEED INFORMATION |
|---|---|---|---|---|
| R001 | F1 | F2 | Pf12 | Vf12 |
| R002 | F3 | F4 | Pf34 | Vf34 |
| ... | ... | ... | ... | ... |

E1

ROUTE GENERATION METHOD, ROUTE GENERATION SYSTEM, AND ROUTE GENERATION PROGRAM

CROSS-REFERENCE TO RELATED APPLICATIONS

This application claims priority under 35 U.S.C. § 119 to JP Application No. 2022-108943 filed Jul. 6, 2022 the entire contents of which are hereby incorporated by reference.

TECHNICAL FIELD

The present disclosure relates to a route generation method, a route generation system, and a route generation program used for generating a route on which a work vehicle is caused to automatically travel.

BACKGROUND ART

In recent years, due to advance in automation technology for agricultural machinery, work vehicles that perform a work while automatically traveling in a field have been introduced. For example, such a work vehicle includes a positioning unit that uses a positioning system to acquire position information of the work vehicle and automatically travels in accordance with a target route preset for a field (see, for example, Patent Document 1).

PRIOR ART DOCUMENT

Patent Document

Patent document 1: Japanese Unexamined Patent Application Publication No. 2019-166981

SUMMARY OF INVENTION

Technical Problem

Incidentally, a work vehicle performs a work in a single field in some cases and performs works in a plurality of fields in other cases. In a case where a work vehicle performs works in a plurality of fields, after finishing a work in one field, the work vehicle travels on a farm road to move to a next field, and then, performs a work in the field. In order to cause the work vehicle to perform works in a plurality of fields in the manner described above, it is necessary to cause the work vehicle to automatically travel between the plurality of fields. However, in a known technology, although it is possible to cause a work vehicle to automatically travel in a single field, it is difficult to cause the work vehicle to automatically travel between a plurality of fields.

It is therefore an object of the present disclosure to provide a route generation method, a route generation system, and a route generation program that can cause a work vehicle to automatically travel between a plurality of areas.

Solution to Problem

A route generation method according to the present disclosure includes receiving a traveling operation performed by a user, acquiring position information of a work vehicle traveling on a connecting road that connects a first area and a second area, based on the traveling operation, and generating an inter-area route on which the work vehicle is caused to automatically travel between the first area and the second area, based on the position information.

A route generation system according to the present disclosure includes a reception processing unit, an acquisition processing unit, and a generation processing unit. The reception processing unit receives a traveling operation performed by a user. The acquisition processing unit acquires position information of a work vehicle traveling on a connecting road that connects a first area and a second area, based on the traveling operation. The generation processing unit generates an inter-area route on which the work vehicle is caused to automatically travel between the first area and the second area, based on the position information.

A route generation program according to the present disclosure causes one or more processors to execute a process including receiving a traveling operation performed by a user, acquiring position information of a work vehicle traveling on a connecting road that connects a first area and a second area, based on the traveling operation, and generating an inter-area route on which the work vehicle is caused to automatically travel between the first area and the second area, based on the position information.

Advantageous Effects of Invention

According to the present disclosure, it is possible to provide a route generation method, a route generation system, and a route generation program that can cause a work vehicle to automatically travel between a plurality of areas.

DESCRIPTION OF EMBODIMENTS

Embodiments described below are specific examples that embody the present disclosure and are not intended to limit the technical scope of the present disclosure.

Figure 1:
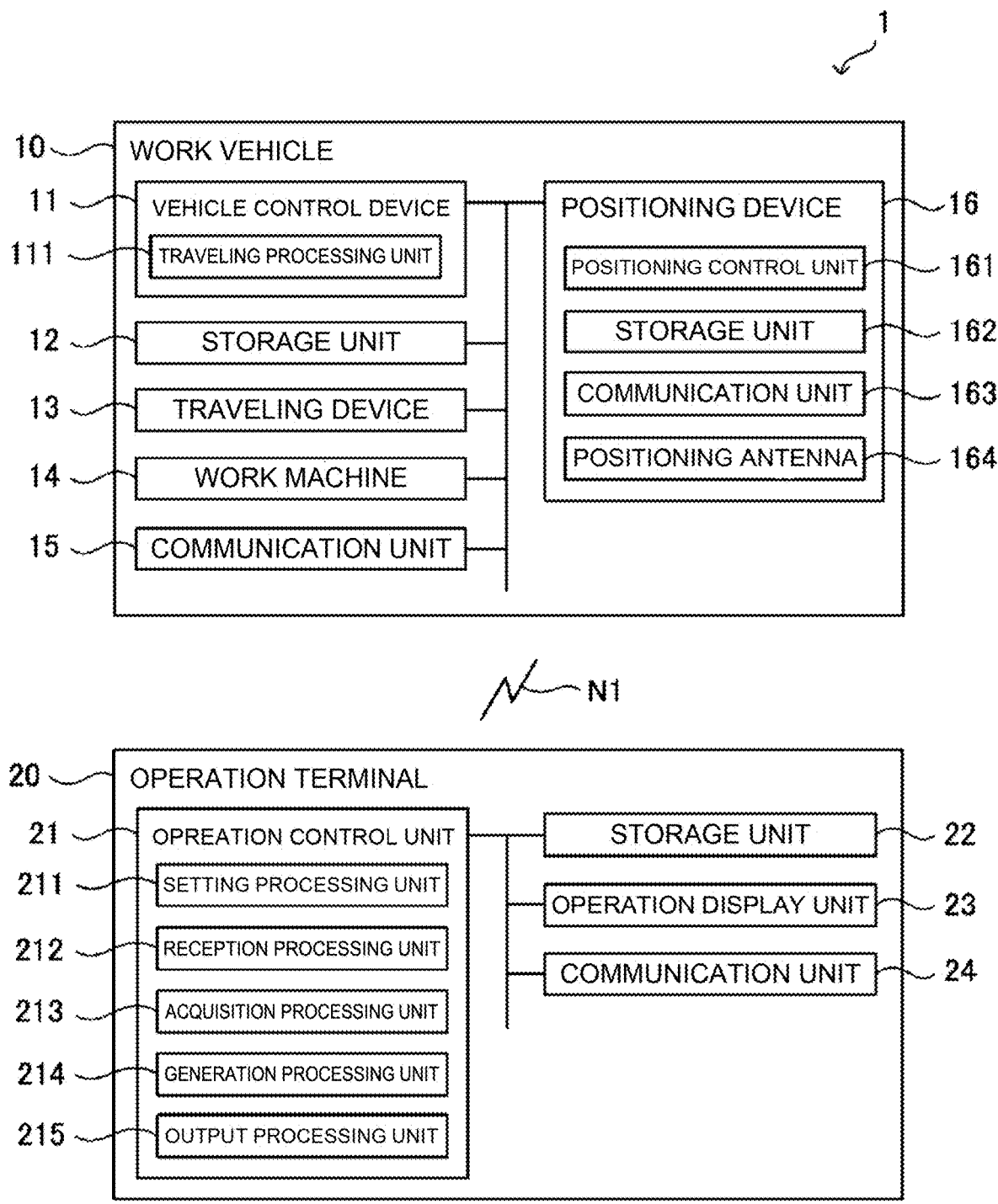
FIG. 1 is a block diagram illustrating a configuration of an automatic traveling system according to an embodiment of the present disclosure.

As illustrated in FIG. 1, an automatic traveling system 1 according to an embodiment of the present disclosure includes a work vehicle 10 and an operation terminal 20. The work vehicle 10 and the operation terminal 20 can communicate with each other via a communication network N1. For example, the work vehicle 10 and the operation terminal 20 can communicate with each other via a mobile phone line network, a packet line network, or a wireless LAN.

In this embodiment, a case where the work vehicle 10 is a tractor will be described as an example. Note that, as another embodiment, the work vehicle 10 may be a rice transplanter, a combine harvester, a construction machine, a snow plow, or the like. The work vehicle 10 is a so-called robot tractor configured to automatically travel (autonomously travel) in a field that is a work area in accordance with a preset target route. In addition, the work vehicle 10 can also perform a predetermined work while automatically traveling in a field. Furthermore, the work vehicle 10 is configured to automatically travel in accordance with an inter-field route in which a road (connecting road) that connects a plurality of fields is preset. The work vehicle 10 automatically travels in accordance with a target route and an inter-field route that have been preset inside a field and outside the field (between fields), based on position information of a current position of the work vehicle 10 calculated by a positioning device 16.

Figure 3:
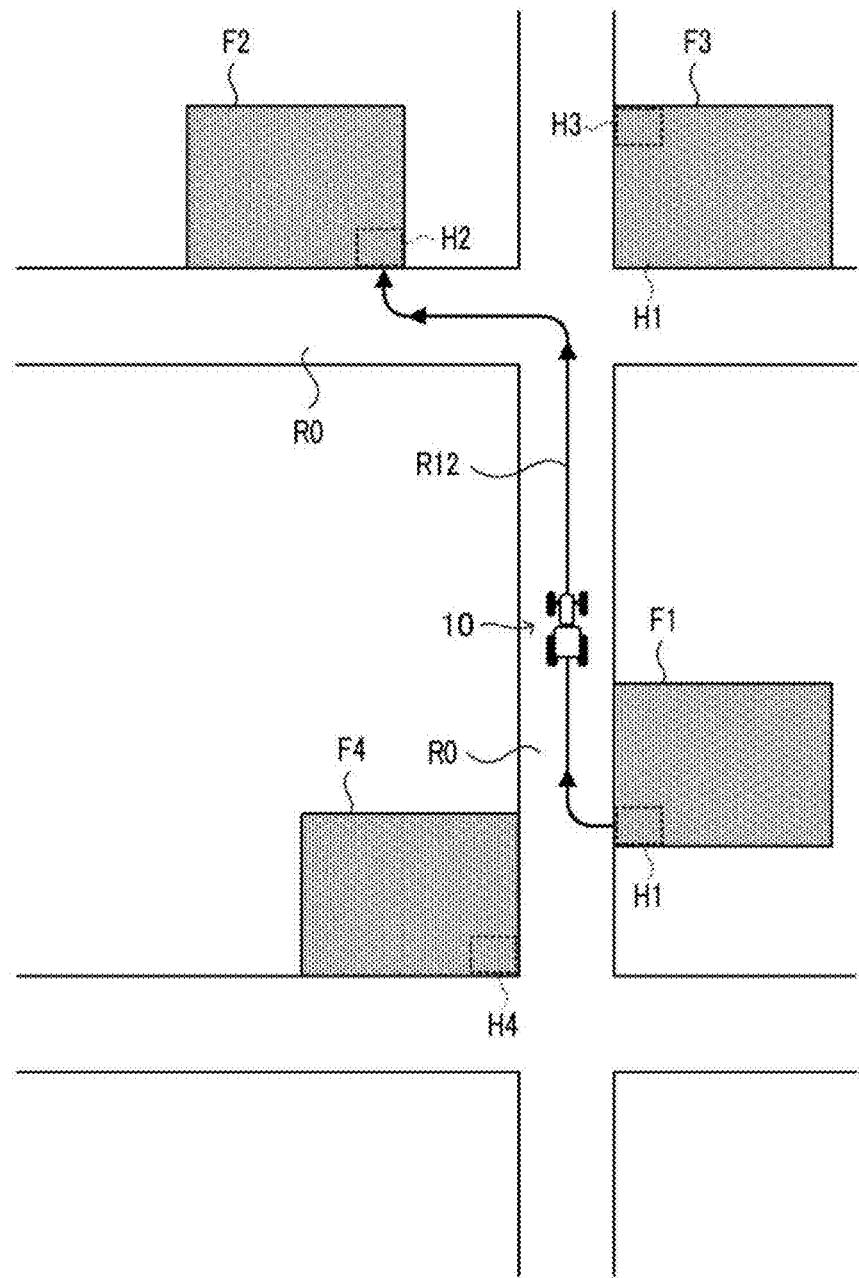
FIG. 3 is a view illustrating an example of an inter-field route for the work vehicle according to an embodiment of the present disclosure.
Figure 4A:
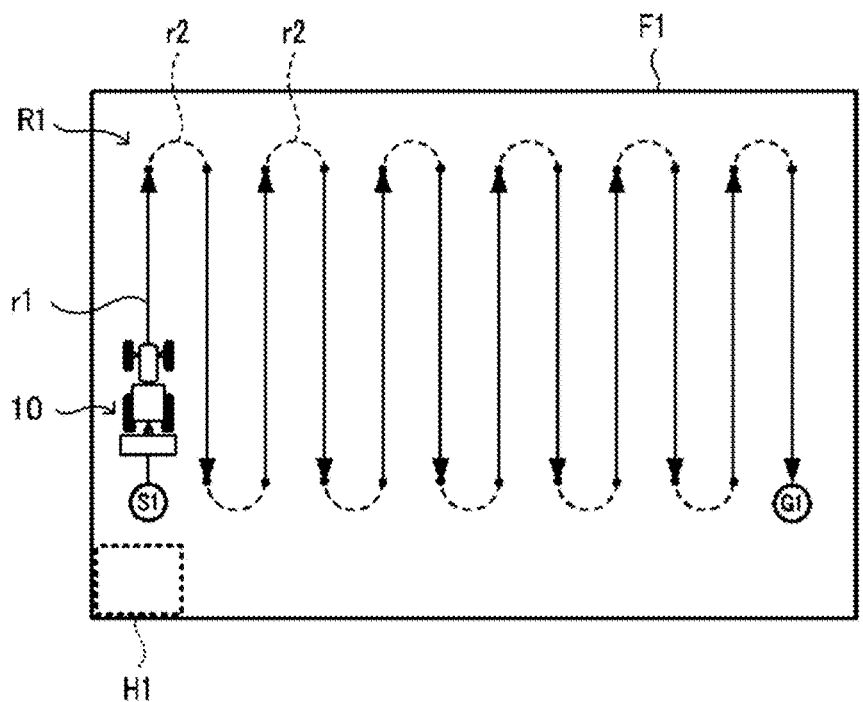
FIG. 4A is a view illustrating an example of a target route for the work vehicle according to an embodiment of the present disclosure.

For example, in a field F1 illustrated in FIG. 3 and FIG. 4A, the work vehicle 10 performs a predetermined work while automatically traveling in accordance with a preset target route R1 (work route). Upon completing the work in field F1, the work vehicle 10 automatically travels on an inter-field route R12 (moving route) on which the road R0 is preset to move to a field F2. For example, the work vehicle 10 automatically travels on the inter-field route R12 that connects the exit/entrance H1 of the field F1 and an exit/entrance H2 of the field F2. Upon arriving at the field F2, the work vehicle 10 performs the predetermined work in the field F2 (see FIG. 3 and FIG. 4B) while automatically traveling in accordance with a preset target route R2 (work route). The target route R1 in the field F1 and the target route R2 in the field F2 are set as appropriate in accordance with respective work contents. The inter-field route R12 of the road R0 is set in accordance with an operation (teaching operation) by an operator (user). In this embodiment, the inter-field route R12 on the road R0 on which the work vehicle 10 moves from the field F1 to the field F2 is used as an example, but the inter-field route R12 may be a route on the road R0 on which the work vehicle 10 moves from the field F2 to the field F1. The target route R1 is an example of a first work route of the present disclosure, and the target route R2 is an example of a second work route of the present disclosure. The inter-field route R12 is an example of an inter-area route of the present disclosure.

Note that the connecting road may be a road dedicated to a work vehicle, such as a farm road, a forest road, a public road, a private road, a motorway, or the like, and may be a road through which a general vehicle (such as a passenger vehicle or the like) can pass.

[Work Vehicle 10]

Figure 2:
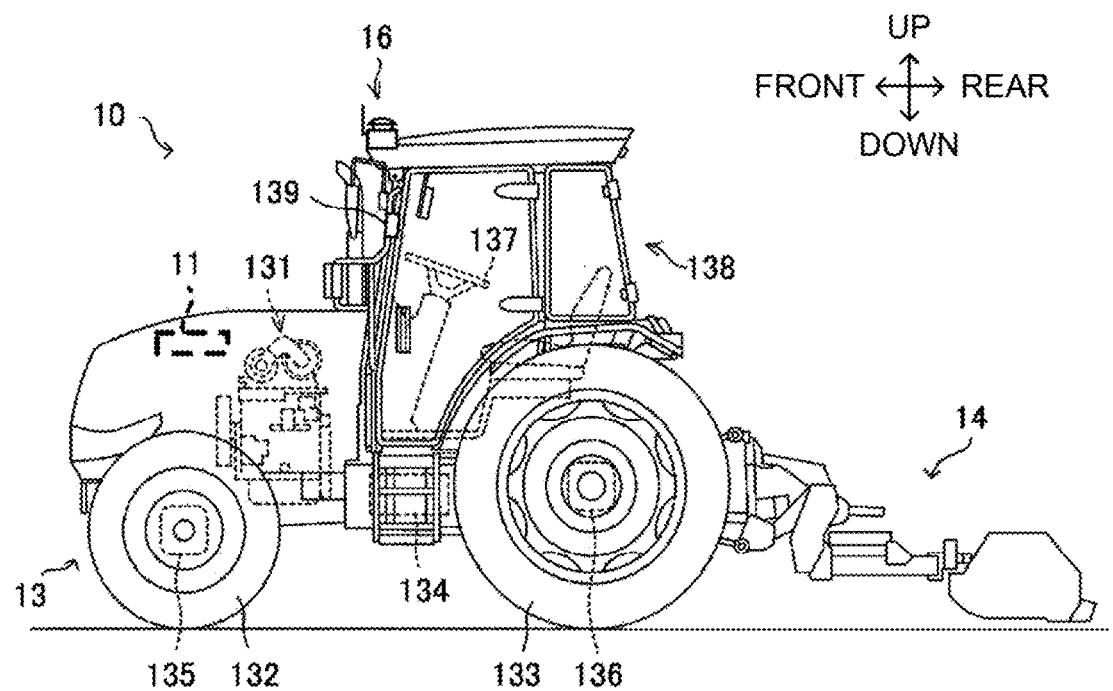
FIG. 2 is an external view illustrating an example of a work vehicle according to an embodiment of the present disclosure.

As illustrated in FIG. 1 and FIG. 2, the work vehicle 10 includes a vehicle control device 11, a storage unit 12, a traveling device 13, a work machine 14, a communication unit 15, a positioning device 16, and the like. The vehicle control device 11 is electrically connected to the storage unit 12, the traveling device 13, the work machine 14, the positioning device 16, and the like. Note that the vehicle control device 11 and the positioning device 16 may be capable of performing wireless communication.

The communication unit 15 is a communication interface that connects the work vehicle 10 to a communication network N1 via a wire or wirelessly and executes data communication with an external device, such as an operation terminal 20, in accordance with a predetermined communication protocol via the communication network N1. The work vehicle 10 can perform wireless communication with the operation terminal 20 via the communication unit 15.

A storage unit 12 is a non-volatile storage unit, such as a hard disk drive (HDD), a solid state drive (SSD), or the like, that stores various types of information. The storage unit 12 stores a control program, such as an automatic travel program that causes the vehicle control device 11 to execute automatic traveling processing (see FIG. 10 and FIG. 11) that will be described below. For example, the automatic traveling program is non-temporarily recorded in a computer-readable recording medium, such as a flash ROM, an EEPROM, a CD, a DVD, or the like, is read by a predetermined reading device (not illustrated), and is stored in the storage unit 12. Note that the automatic traveling program may be downloaded from a server (not illustrated) to the work vehicle 10 via the communication network N1 and be stored in the storage unit 12. The storage unit 12 may be also configured to store route data for a target route and an inter-field route that are generated at the operation terminal 20.

The traveling device 13 is a driving unit that causes the work vehicle 10 to travel. As illustrated in FIG. 2, the traveling device 13 includes an engine 131, front wheels 132, rear wheels 133, a transmission 134, a front axle 135, a rear axle 136, a steering wheel 137, and the like. Note that the front wheels 132 and the rear wheels 133 are provided at left and right of the work vehicle 10. Moreover, the traveling device 13 is not limited to a wheel type including the front wheels 132 and the rear wheels 133, and may be a crawler type including crawlers provided at left and right of the work vehicle 10.

The engine 131 is a driving source, such as a diesel engine, a gasoline engine, or the like, that is driven using fuel supplied in a fuel tank (not illustrated). The traveling device 13 may include an electric motor as a driving source together with the engine 131 or instead of the engine 131. Note that a power generator (not illustrated) is connected to the engine 131 and electric power is supplied from the power generator to an electric component, such as the vehicle control device 11 or the like, a battery, or the like, that is provided in the work vehicle 10. Note that the battery is charged with the electric power supplied from the generator. Then, the electric components, such as the vehicle control device 11, the positioning device 16, or the like, that are provided in the work vehicle 10 can be driven with the electric power supplied from the battery even after the engine 131 stops.

The driving force of the engine 131 is transmitted to the front wheels 132 via the transmission 134 and the front axle 135 and to the rear wheels 133 via the transmission 134 and the rear axle 136. Furthermore, the driving force of the engine 131 is also transmitted to the work machine 14 via a PTO shaft (not illustrated). When the work vehicle 10 performs automatic traveling, the traveling device 13 performs travel movement in accordance with a command from the vehicle control device 11.

The work machine 14 is, for example, a mower, a cultivator, a plow, a fertilizer applicator, a seeding machine, a spraying machine, or the like, that can be attached to and detached from the work vehicle 10. Thus, the work vehicle 10 can perform various types of works using the above-described work machines 14. In this embodiment, a case where the work machine 14 is a mower will be described as an example.

For example, the work vehicle 10 includes a directly mounted work machine 14 (mower) and performs a mowing work while traveling within each of the field F1 and the field F2. Note that the work machine 14 is not limited to a directly mounted work machine fixed to the work vehicle 10 but may be also a towing type work machine that is towed by the work vehicle 10.

When traveling on the road R0 (see FIG. 3), the work vehicle 10 may travel with the work machine 14 attached thereto or with the work machine 14 removed therefrom. For example, in a case where the work vehicle 10 performs a mowing work in each of the field F1 and the field F2, the work vehicle 10 travels, after the mowing work in the field F1 is completed, on the road R0 with the mower attached thereto to move to the field F2, and performs a mowing work in the field F2. Note that, when the work vehicle 10 includes a lifting function to raise and lower the work machine 14, the work vehicle 10 travels on the road R0 with the work machine 14 raised. For example, in a case where different works are performed in the field F1 and the field F2, the work vehicle 10 travels, after a work in the field F1 is completed, to on the road R0 with the work machine 14 removed therefrom, to move to the field F2 and performs a work with the work machine 14 attached thereto in the field F2.

The steering wheel 137 is an operation unit that is operated by the operator or the vehicle control device 11. For example, in the traveling device 13, an angle of the front wheels 132 is changed by a hydraulic power steering mechanism (not illustrated) or the like in accordance with an operation of the steering wheel 137 by the vehicle control device 11, so that the traveling direction of the work vehicle 10 is changed. When the operator performs a teaching operation (details thereof will be described below), the operator operates the steering wheel 137 to manually causes the work vehicle 10 to travel.

The traveling device 13 includes, in addition to the steering wheel 137, a shift lever, an accelerator, a brake, and the like (not illustrated) that are operated by the vehicle control device 11. In the traveling device 13, a gear of the transmission 134 is switched to a forward gear, a reverse gear, or the like in accordance with an operation of the shift lever by the vehicle control device 11, and a traveling mode of the work vehicle 10 is switched to a forward mode, a reverse mode, or the like. The vehicle control device 11 controls rotation speed of the engine 131 by operating the accelerator. The vehicle control device 11 brakes the rotation of the front wheels 132 and the rear wheels 133 using an electromagnetic brake by operating the brake.

The positioning device 16 is a communication device including a positioning control unit 161, a storage unit 162, a communication unit 163, a positioning antenna 164, and the like. For example, as illustrated in FIG. 2, the positioning device 16 is provided above a cabin 138 on which the operator rides. An installation side of the positioning device 16 is not limited to the cabin 138. Furthermore, the positioning control unit 161, the storage unit 162, the communication unit 163, and the positioning antenna 164 of the positioning device 16 may be arranged in a dispersed manner in different positions in the work vehicle 10. Note that the battery is connected to the positioning device 16 as described above, and the positioning device 16 can operate even while the engine 131 is stopped. As the positioning device 16, for example, a mobile phone terminal, a smart phone, a tablet terminal, or the like may be used an alternative.

The positioning control unit 161 is a computer system that includes one or more processors and storage memories, such as a nonvolatile memory, an RAM, or the like. The storage unit 162 is a non-volatile memory or the like that stores a program that causes the positioning control unit 161 to execute a positioning processing, and data, such as positioning information, movement information, or the like. For example, the program is non-temporarily recorded in a computer-readable recording medium, such as a flash ROM, an EEPROM, a CD, a DVD, or the like, is read by a predetermined reading device (not illustrated), and is stored in the storage unit 162. Note that the program may be downloaded from a server (not illustrated) to the positioning device 16 via the communication network N1 and be stored in the storage unit 162.

The communication unit 163 is a communication interface that connects the positioning device 16 to the communication network N1 via a wire or wirelessly and executes data communication with an external device, such as a base station (not illustrated) or the like, via the communication network N1 in accordance with a predetermined communication protocol.

The positioning antenna 164 is an antenna that receives radio waves (GNSS signals) transmitted from satellites.

The positioning control unit 161 calculates the current position of the work vehicle 10, based on a GNSS signal received from a satellite by the positioning antenna 164. For example, when the work vehicle 10 automatically travels in the field F1, in the field F2, on the road R0, or the like, and the positioning antenna 164 receives radio waves (transmission time, orbit information, or the like) transmitted from each of a plurality of satellites, the positioning control unit 161 calculates a distance between the positioning antenna 164 and each satellite and calculates the current position (latitude and longitude) of the work vehicle 10, based on the calculated distance. Alternatively, the positioning control unit 161 may be configured to perform positioning by a real-time kinematic positioning method (an RTK-GPS positioning method (an RTK method)) in which the current position of the work vehicle 10 is calculated by using correction information that corresponds to the base station (a reference station) near the work vehicle 10. As described above, the work vehicle 10 automatically travels by using positioning information acquired by the RTK method. Note that the current position of the work vehicle 10 may be the same position as a positioning position (for example, a position of the positioning antenna 164) or may be a position that is deviated from the positioning position.

The vehicle control device 11 includes control devices, such as a CPU, a ROM, a RAM, or the like. The CPU is a processor that executes various types of arithmetic processing. The ROM is a non-volatile storage unit that stores a control program, such as a BIOS, an OS, or the like, that causes the CPU to execute various types of arithmetic processing in advance. The RAM is a volatile or non-volatile storage unit that stores various types of information and is used as a transient storage memory (work area) used for various types of processing executed by the CPU. Then, the vehicle control device 11 causes the CPU to execute various types of control programs that have been stored in the ROM or the storage unit 12 in advance, thereby controlling the work vehicle 10.

The vehicle control device 11 controls movement of the work vehicle 10 in accordance with various types of user operations performed on the work vehicle 10. The vehicle control device 11 executes automatic traveling processing of the work vehicle 10, based on the current position of the work vehicle 10 calculated by the positioning device 16 and a target route and an inter-field route that have been preset.

As illustrated in FIG. 1, the vehicle control device 11 includes various processing units, such as a traveling processing unit 111 or the like. Note that the vehicle control device 11 functions as the various processing units by causing the CPU to execute the various types of processing in accordance with the automatic traveling programs. Each of some or all of the processing units may be configured by an electronic circuit. Note that the automatic traveling program may be a program that causes a plurality of processors to function as the processing units.

The traveling processing unit 111 controls traveling of the work vehicle 10. Specifically, upon acquiring a traveling start instruction from the operation terminal 20, the traveling processing unit 111 causes the work vehicle 10 to start automatic traveling. For example, when the operator presses a start button on an operation screen of the operation terminal 20, the operation terminal 20 outputs a traveling start instruction to the work vehicle 10. Upon acquiring the traveling start instruction from the operation terminal 20, the traveling processing unit 111 causes the work vehicle 10 to start automatic traveling. Thus, the work vehicle 10, for example, starts automatic traveling in accordance with the target route R1 (see FIG. 4A) in the field F1 and starts a work by the work machine 14. The work vehicle 10, for example, also starts automatic traveling in accordance with the target route R2 (see FIG. 4B) in the field F2 and starts a work by the work machine 14. The work vehicle 10, for example, also performs automatic traveling in accordance with the inter-field route R12 (see FIG. 3) on the road R0. That is, the traveling processing unit 111 can cause the work vehicle 10 to automatically travel in accordance with the inter-field route R12 on the road R0 outside the field. For example, the traveling processing unit 111 causes the work vehicle 10 to automatically travel on the road R0 that connects the field F1 and the field F2 in accordance with the inter-field route R12 set on the road R0. Note that the target routes and inter-field routes on which the work vehicle 10 automatically travels are generated, for example, at the operation terminal 20. The work vehicle 10 acquires route data corresponding to the target route and the inter-field route from the operation terminal 20 and automatically travels in accordance with the target route and the inter-field route.

Upon acquiring a traveling stop instruction from the operation terminal 20, the traveling processing unit 111 stops automatic traveling of the work vehicle 10. For example, when the operator presses a stop button on the operation screen of the operation terminal 20, the operation terminal 20 outputs the traveling stop instruction to the work vehicle 10.

In addition, in a case where the work vehicle 10 detects an obstacle, the traveling processing unit 111 causes the work vehicle 10 to stop automatic traveling. For example, in a case where an obstacle detection device (not illustrated) mounted on the work vehicle 10 detects an obstacle in a range of 3 m to 8 m in front of the work vehicle 10, the traveling processing unit 111 causes the work vehicle 10 to travel at reduced speed. Furthermore, in a case where the obstacle detection device detects an obstacle in a range of a shorter distance than 3 m in front of the work vehicle 10, the traveling processing unit 111 causes the work vehicle 10 to stop.

[Operation Terminal 20]

As illustrated in FIG. 1, the operation terminal 20 is an information processing device that includes an operation control unit 21, a storage unit 22, an operation display unit 23, a communication unit 24, and the like. The operation terminal 20 may be configured of a portable terminal, such as a tablet terminal, a smartphone, or the like.

The communication unit 24 is a communication interface that connects the operation terminal 20 to the communication network N1 via a wire or wirelessly and executes data communication with an external device, such as one or more work vehicles 10 or the like, via the communication network N1 in accordance with a predetermined communication protocol.

The operation display unit 23 is a user interface including a display unit, such as a liquid crystal display or an organic EL display, that displays various types of information and an operation unit, such as a touch panel, a mouse, or a keyboard, that receives operations. On the operation screen displayed on the display unit, the operator can operate the operation unit to perform an operation of registering various types of information (such as work vehicle information, field information, work information, or the like that will be described later).

The operator also performs an operation (teaching operation) of setting the inter-field route R12 on which the work vehicle 10 is caused to automatically travel on the road R0 (connecting road) that connects the field F1 and the field F2 in the operation unit.

In addition, the operator can operate the operation unit to make a traveling start instruction, a traveling stop instruction, or the like to the work vehicle 10. Furthermore, the operator can grasp a traveling state of the work vehicle 10 that automatically travels in the field F1, the field F2, and the road R0 in accordance with the target route and the inter-field route along a traveling locus displayed on the operation terminal 20 in a place distant from the work vehicle 10.

The storage unit 22 is a non-volatile storage unit, such as an HDD, an SSD, or the like, that stores various types of information. The storage unit 22 stores a control program, such as an automatic traveling program that causes the operation control unit 21 to execute automatic traveling processing (see FIG. 10 and FIG. 11) that will be described later, or the like. For example, the autonomous travel program is non-temporarily recorded in a computer-readable recording medium, such as a flash ROM, an EEPROM, a CD, a DVD, or the like, is read by a predetermined reading device (not illustrated), and is stored in the storage unit 22. Note that the automatic traveling program may be downloaded from a server (not illustrated) to the operation terminal 20 via the communication network N1 and be stored in the storage unit 22.

A dedicated application used for causing the work vehicle 10 to automatically travel is installed in the storage unit 22. The operation control unit 21 activates the dedicated application to perform setting processing of setting various types of information about the work vehicle generation processing of generating a target route and an inter-field route of the work vehicle 10, automatic traveling instruction to the work vehicle 10, or the like.

Data, such as work vehicle information that is information about the work vehicle 10, target route information that is information about the target route, or the like, is stored in the storage unit 22.

The work vehicle information includes information, such as a vehicle number, a vehicle type, or the like, for each work vehicle 10. The vehicle number is identification information of the work vehicle 10. The vehicle type is a type of the work vehicle 10.

Note that the work vehicle information about a single work vehicle 10 may be stored in the storage unit 22, and the work vehicle information about a plurality of work vehicles 10 may be stored the storage unit 22. For example, in a case where a particular operator owns a plurality of the work vehicles 10, the work vehicle information about each of the work vehicles 10 is stored in the storage unit 22.

The target route information includes information, such as a route name, a field name, an address, a field area, a work time, or the like, for each target route. The route name is a route name of the target route generated in the operation terminal 20. The field name is a name of the field that is a work target for which the target route has been set. The address is an address of the field and the field area is an area of the field. The work time is a time required for the work vehicle 10 to perform a work in the field.

In a case where the target route is a route (inter-field route) corresponding to the road R0, the target route information includes information, such as a route name, an address, a travel distance, a travel time, or the like. The route name is a name of the road R0 and the address is an address of the road R0. The travel distance is a distance for which the work vehicle 10 travels on the road R0, that is, for example, a distance from the field F1 to the field F2. The travel time is a time required for the work vehicle 10 to travel on the road R0, that is, for example, a time required for the work vehicle 10 to move from the field F1 to the field F2.

Note that the target route information about a single target route may be stored in the storage unit 22 and the target route information about a plurality of target routes may be stored in the storage unit 22. For example, in a case where a particular operator generates a plurality of target routes for one or more fields owned by the operator, the target route information about each target route is stored in storage unit 22. Note that one target route may be set for a single field and a plurality of target routes may be set for a single field. One inter-field route may be set for a single set of fields and a plurality of inter-field routes may be set for a single set of fields. In this embodiment, the target route information corresponding to the target route R1 (see FIG. 4A) for traveling in the field F1, the target route information corresponding to the target route R2 (see FIG. 4B) for traveling in the field F2, and the target route information corresponding to the inter-field route R12 (see FIG. 3) for traveling on the road R0 are stored in the storage unit 22.

Note that, as another embodiment, some or all of the information, such as the work vehicle information, the target route information, or the like, may be stored in a server accessible from the operation terminal 20. The operator may perform operations of registering and editing the work vehicle information and the target route information in the server (for example, a personal computer, a cloud server, or the like). In this case, the operation control unit 21 may be configured to acquire the information from the server and execute each processing, such as the automatic traveling processing (see FIG. 10 and FIG. 11) that will be described later.

The operation control unit 21 includes control devices, such as a CPU, a ROM, a RAM, and the like. The CPU is a processor that executes various types of arithmetic processing. The ROM is a non-volatile storage unit that stores a control program, such as a BIOS, an OS, or the like, that causes the CPU to execute various types of arithmetic processing in advance. The RAM is a volatile or non-volatile storage unit that stores various types of information and is used as a transient storage memory used for various types of processing executed by the CPU. The operation control unit 21 controls the operation terminal 20 by causing the CPU to execute various control programs that have been stored in the ROM or the storage unit 22 in advance.

As illustrated in FIG. 1, the operation control unit 21 includes various processing units, such as a setting processing unit 211, a reception processing unit 212, an acquisition processing unit 213, a generation processing unit 214, and an output processing unit 215. Note that the operation control unit 21 functions as various processing units by causing the CPU to execute various types of processing in accordance with the control programs. Each of some or all of the processing units may be configured by an electronic circuit. Note that the control programs may be programs that cause a plurality of processors to function as the processing units.

Figure 5A:
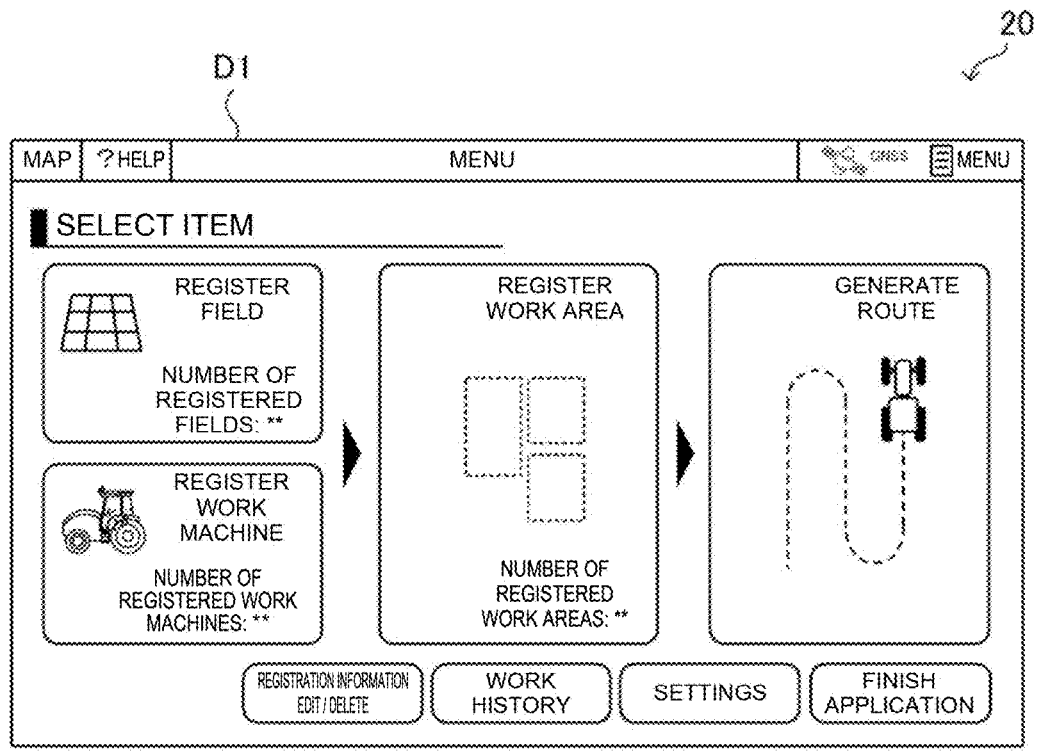
FIG. 5A is a view illustrating an example of an operation screen displayed on an operation terminal according to an embodiment of the present disclosure.

The setting processing unit 211 sets information (which will be hereinafter referred to as work vehicle information) about the work vehicle 10, information (which will be hereinafter referred to as field information) about a field F, and information (which will be hereinafter referred to as work information) about how to specifically perform a work. The setting processing unit 211 receives a setting operation performed by the operator on a setting screen D1, for example, illustrated in FIG. 5A and registers each setting information.

Specifically, for information of a model of the work vehicle 10, a position where the positioning antenna 164 is mounted on the work vehicle 10, a type of the work machine 14, a size and a shape of the work machine 14, a position of the work machine 14 with respect to the work vehicle 10, vehicle speed and engine speed of the work vehicle 10 during a work, vehicle speed and engine speed of the work vehicle 10 during turning, or the like, the setting processing unit 211 sets the information by performing a registration operation by the operator at the operation terminal 20.

Also, for information of a position and a shape of the field F, a work start point (traveling start point) where a work is started, a work end point (traveling end point) where a work is finished, a work direction, or the like, the setting processing unit 211 sets the information by performing the registration operation at the operation terminal 20.

For example, the operator rides on the work vehicle 10, drives the work vehicle 10 to travel around an outer periphery of the field F once, and records transition of position information of the positioning antenna 164 at that time, so that the information about the position and the shape of the field F can be automatically acquired. Furthermore, the position and the shape of the field F can be also acquired, based on a polygon obtained by operating the operation terminal 20 by the operator in a state where a map is displayed on the operation terminal 20 and designating a plurality of points on the map. An area specified by the acquired position and shape of the field F is an area (travel area) in which the work vehicle 10 can be caused to travel.

Figure 4B:
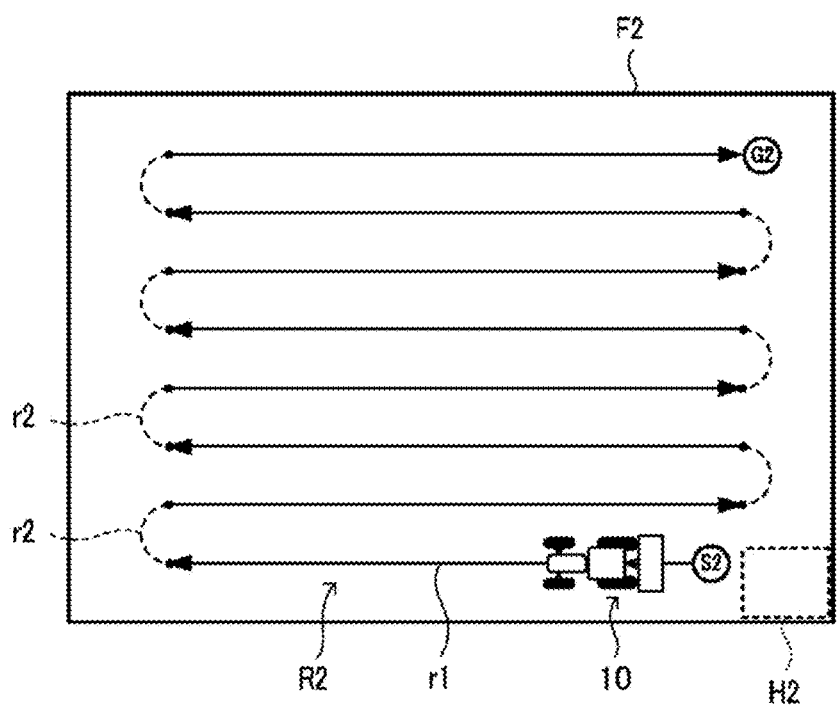
FIG. 4B is a view illustrating an example of the target route for the work vehicle according to an embodiment of the present disclosure.

For example, the setting processing unit 211 registers field information of the field F1 illustrated in FIG. 4A and field information of the field F2 illustrated in FIG. 4B.

The setting processing unit 211 is configured such that, as work information, presence or absence of a cooperative work by a work vehicle 10 (unmanned tractor) and a manned work vehicle 10, a skip number that is the number of work routes that are to be skipped in a case where the work vehicle 10 turns around a headland, a width of a headland, a width of a non-cultivated field, or the like can be set.

Based on each setting information described above, the setting processing unit 211 generates a target route for causing the work vehicle 10 to automatically travel in the field F. Specifically, the setting processing unit 211 generates a target route in the field F, based on the traveling start point and the traveling end point registered in field setting. For example, as illustrated in FIG. 4A, the setting processing unit 211 generates the target route R1 including a traveling start point S1, a traveling end point G1, a straight route r1 (solid line portion in FIG. 4A), and a turning route r2 (dotted-line portion in FIG. 4A), based on a setting operation performed by the operator. For example, as illustrated in FIG. 4B, the setting processing unit 211 generates the target route R2 including a traveling start point S2, a traveling end point G2, a straight route r1 (solid line portion in FIG. 4B), and a turning route r2 (dotted-line portion in FIG. 4B), based on a setting operation performed by the operator.

The setting processing unit 211 registers the generated target route R1 in association with the field F1 and registers the generated target route R2 in association with the field F2.

Herein, as will be described below, the operation control unit 21 generates an inter-field route of the road R0 that connects the plurality of fields F, based on an operation performed by the operator.

Specifically, the reception processing unit 212 receives a traveling operation performed by the operator. For example, the reception processing unit 212 receives a traveling operation of manually causing the work vehicle 10 to travel from the field F1 to the field F2. The acquisition processing unit 213 acquires the position information of the work vehicle 10 that travels on the road R0 that connects the field F1 and the field F2, based on the traveling operation. The generation processing unit 214 generates an inter-field route R12 on which the work vehicle 10 is caused to automatically travel between the field F1 and the field F2, based on the position information.

Figure 5B:
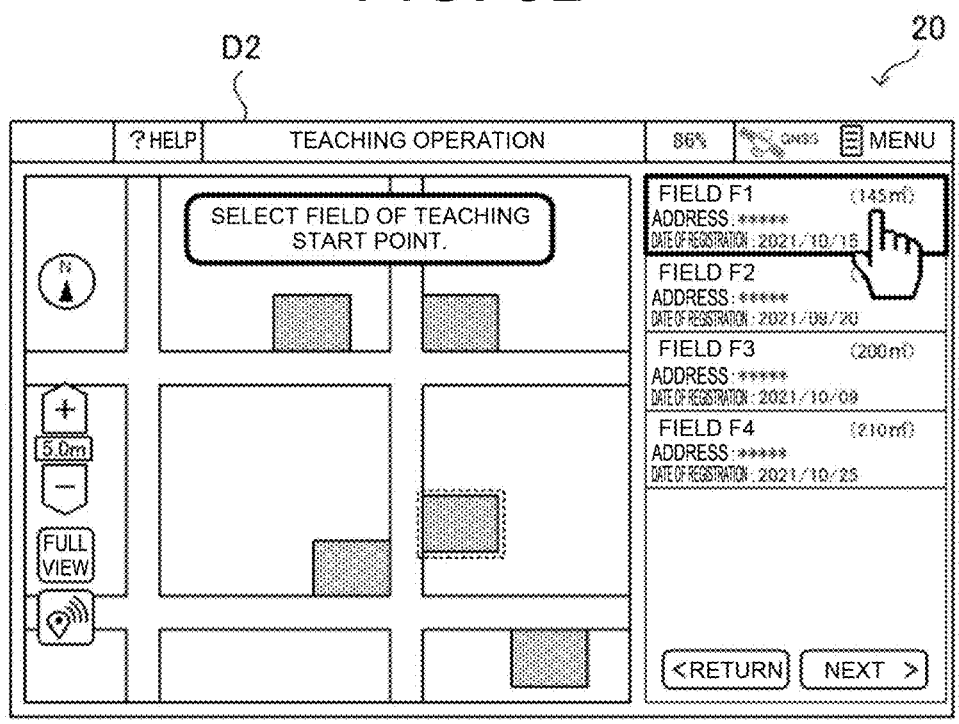
FIG. 5B is a view illustrating an example of a teaching operation screen displayed on the operation terminal according to an embodiment of the present disclosure.

For example, the reception processing unit 212 displays a teaching operation screen D2 illustrated in FIG. 5B and receives an operation of selecting a field from the operator. The teaching operation screen D2 displays a list of the field information of the plurality of fields F that have been registered by the setting processing unit 211. The operator selects a plurality of fields that are targets of inter-field routes on the teaching operation screen D2.

First, the operator selects a field (in this case, the field F1) where the teaching operation is started (see FIG. 5B). When the operator selects the field F1, the reception processing unit 212 identifiably displays the selected field F1 (displays a dotted-line framed image) on the map of the teaching operation screen D2 (see FIG. 5B).

Figure 5C:
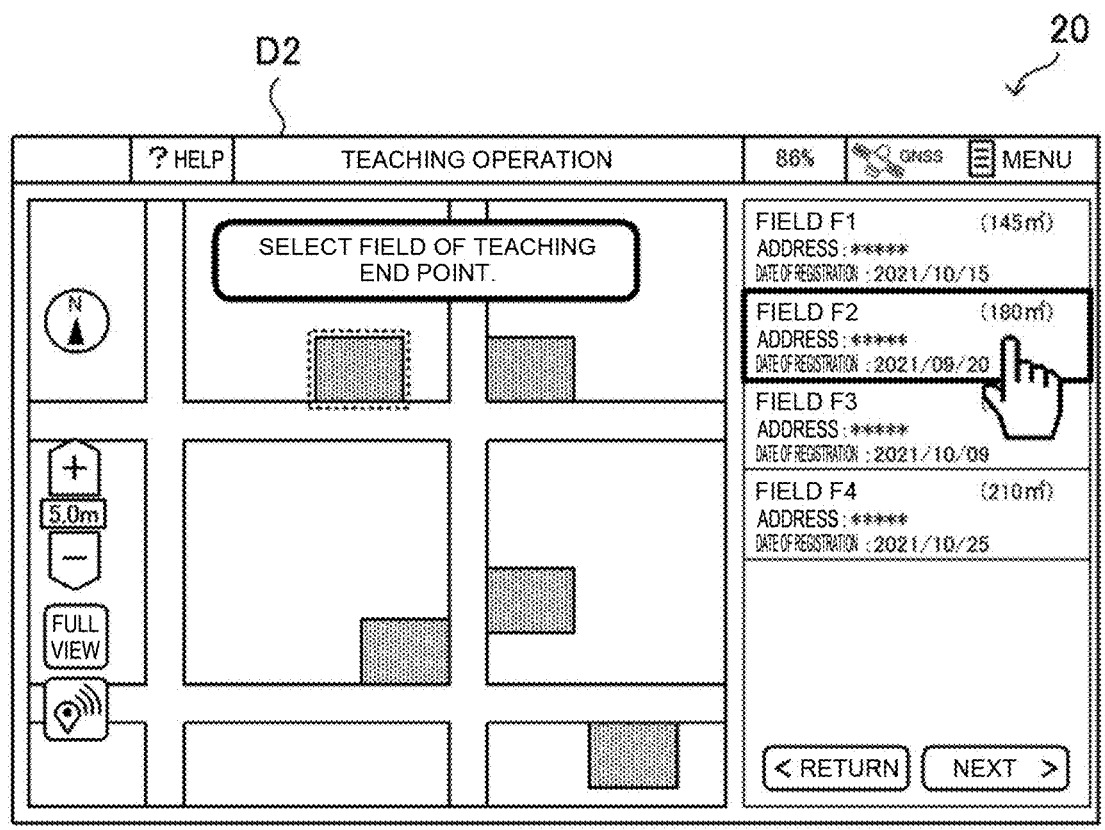
FIG. 5C is a view illustrating an example of the teaching operation screen displayed on the operation terminal according to an embodiment of the present disclosure.

Next, the operator selects the field (in this case, the field F2) where the teaching operation is to be finished (see FIG. 5C). When the operator selects the field F2, the reception processing unit 212 identifiably displays the selected field F2 (displays a dotted-line framed image) on the map of the teaching operation screen D2 (see FIG. 5C).

When the reception processing unit 212 receives the operation of selecting the plurality of fields F that are targets of the inter-field route from the operator, the reception processing unit 212 receives a start operation of starting teaching traveling. For example, on the teaching operation screen D2 illustrated in FIG. 6A, when the operator presses the start button, the reception processing unit 212 receives the start operation of starting teaching traveling. When the reception processing unit 212 receives the start operation, the reception processing unit 212 sets the route start point Ts1 in the field F1. For example, the reception processing unit 212 sets the current position of the work vehicle 10 at a time when the start operation is received as the route start point Ts1 (an example of a first end point of the present disclosure).

As another embodiment, the reception processing unit 212 may be configured to set the route start point Ts1 in the field F1 when the start operation is received from the operator in a state where the work vehicle 10 is located in a predetermined area in the field F1. For example, provided that the work vehicle 10 is located in an area of an exit/entrance H1 in the field F1 (see FIG. 4A), the reception processing unit 212 receives the start operation performed by the operator and sets the route start point Ts1 in the field F1. In contrast, when the work vehicle 10 is located outside the area of the exit/entrance H1 in the field F1, the reception processing unit 212 does not set the route start point Ts1 in the field F1 even when the reception processing unit 212 receives the start operation performed by the operation. In this case, the reception processing unit 212 may be configured to notify a message indicating that the route start point Ts1 cannot be set, a message urging causing the work vehicle 10 to move into the area of the exit/entrance H1, or the like. According to this configuration, the start point of the inter-field route for moving between fields can be set in a specific area (for example, the exit/entrance H1), and therefore, a position through which the work vehicle 10 exits from inside of one field to outside of the field. The exit/entrance H1 is an example of a first predetermined area of the present disclosure.

Figure 6A:
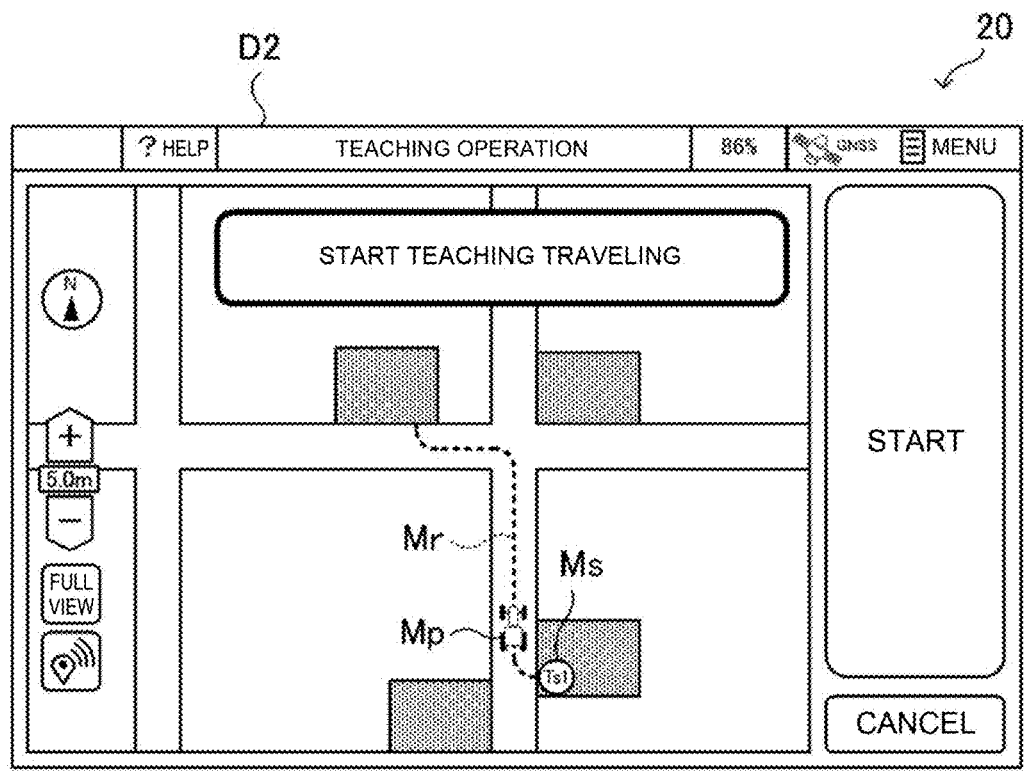
FIG. 6A is a view illustrating an example of the teaching operation screen displayed on the operation terminal according to an embodiment of the present disclosure.

When the reception processing unit 212 receives the start operation from the operator, the reception processing unit 212 displays a route start point image Ms in which the route start point Ts1 is indicated at the exit/entrance H1 of the field F1 on the map of the teaching operation screen D2 (see FIG. 6A). As illustrated in FIG. 6A, the reception processing unit 212 displays a guide route Mr (dotted-line) that connects the field F1 and the field F2 as information to support a traveling operation of teaching traveling. Thus, the operator can perform a manual traveling operation (driving) in accordance with the guide route Mr, and therefore, the operator can easily perform the operation of teaching traveling.

For example, the operator brings in the operation terminal 20 to the work vehicle 10 and manually causes the work vehicle 10 to travel on the road R0 (see FIG. 3) from the field F1 to the field F2 while checking the guide route Mr displayed on the operation terminal 20. The reception processing unit 212 displays a current position image Mp in a point on the guide route Mr corresponding to the current position of the work vehicle 10 on the teaching operation screen D2.

The acquisition processing unit 213 acquires the position information of the work vehicle 10 while the operator causes the work vehicle 10 to perform teaching traveling. The acquisition processing unit 213 also acquires information of the travel speed of the work vehicle 10 during teaching traveling. Note that the acquisition processing unit 213 may be configured to acquire information about the road R0 during teaching traveling (for example, information, such as an obstacle, a road surface condition, a road width, a temporary stop line, a speed limit, a traffic signal, or the like).

Figure 6B:
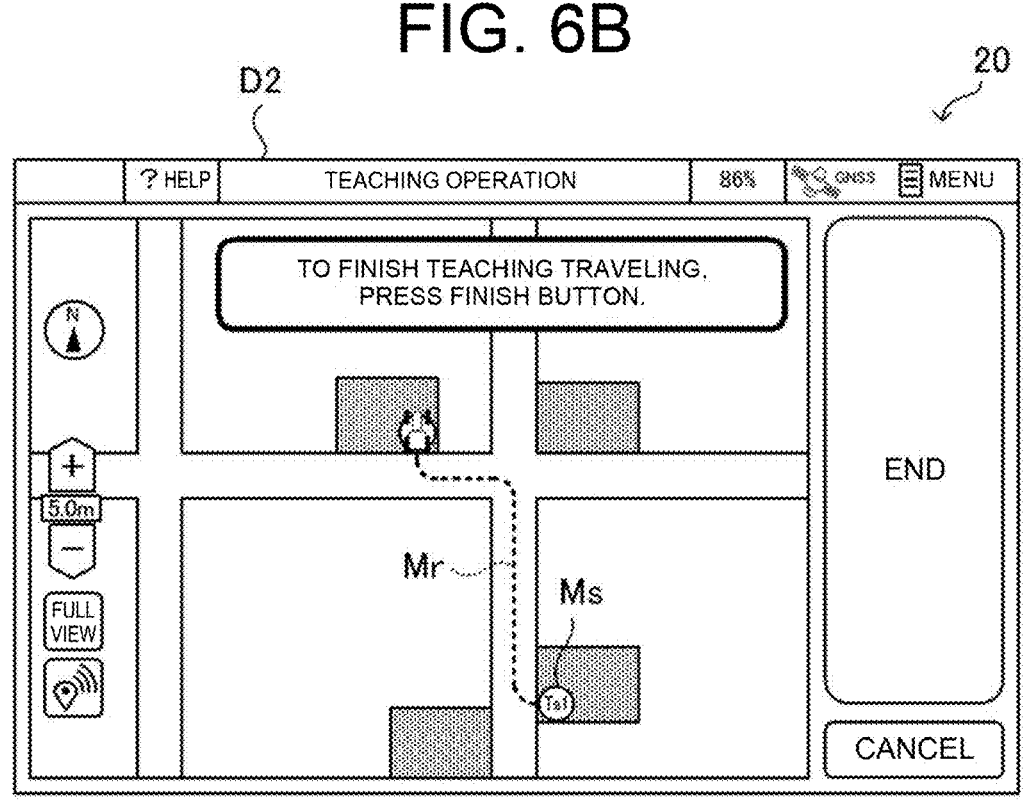
FIG. 6B is a view illustrating an example of the teaching operation screen displayed on the operation terminal according to an embodiment of the present disclosure.

When the operator drives the work vehicle 10 to the field F2 and the work vehicle 10 arrives at the field F2, the operator presses the end button on the teaching operation screen D2 (see FIG. 6B). When the operator presses the end button, the reception processing unit 212 receives an end operation of finishing teaching traveling. When the reception processing unit 212 receives the end operation, the reception processing unit 212 sets a route end point Te2 in the field F2. For example, the reception processing unit 212 sets, as the route end point Te2 (an example of a second end point of the present disclosure), the current position of the work vehicle 10 at a time when the reception processing unit 212 receives the end operation.

As another embodiment, the reception processing unit 212 may be configured to set the route end point Te2 in the field F2 when the end operation is received from the operator in a state where the work vehicle 10 is located in a predetermined area in the field F2. For example, provided that the work vehicle 10 is located within an area of the exit/entrance H2 in the field F2 (see FIG. 4B), the reception processing unit 212 receives the end operation performed by the operator and sets the route end point Te2 in the field F2. In contrast, when the work vehicle 10 is located outside the field F2 or outside the area of the exit/entrance H2 in the field F2, the reception processing unit 212 does not set the route end point Te2 in the field F2 even when the reception processing unit 212 receives the end operation performed by the operator. In this case, the reception processing unit 212 may be configured to notify a message indicating that the route end point Te2 cannot be set, a message urging causing the work vehicle 10 to move into the area of the exit/entrance H2, or the like. According to this configuration, the end point of the inter-field route used for moving between fields can be set in a specific area (for example, the exit/entrance H2), and therefore, a point through which the work vehicle 10 enters from outside of one field to inside of the field can be limited. The exit/entrance H2 is an example of a second predetermined area of the present disclosure.

Figure 6C:
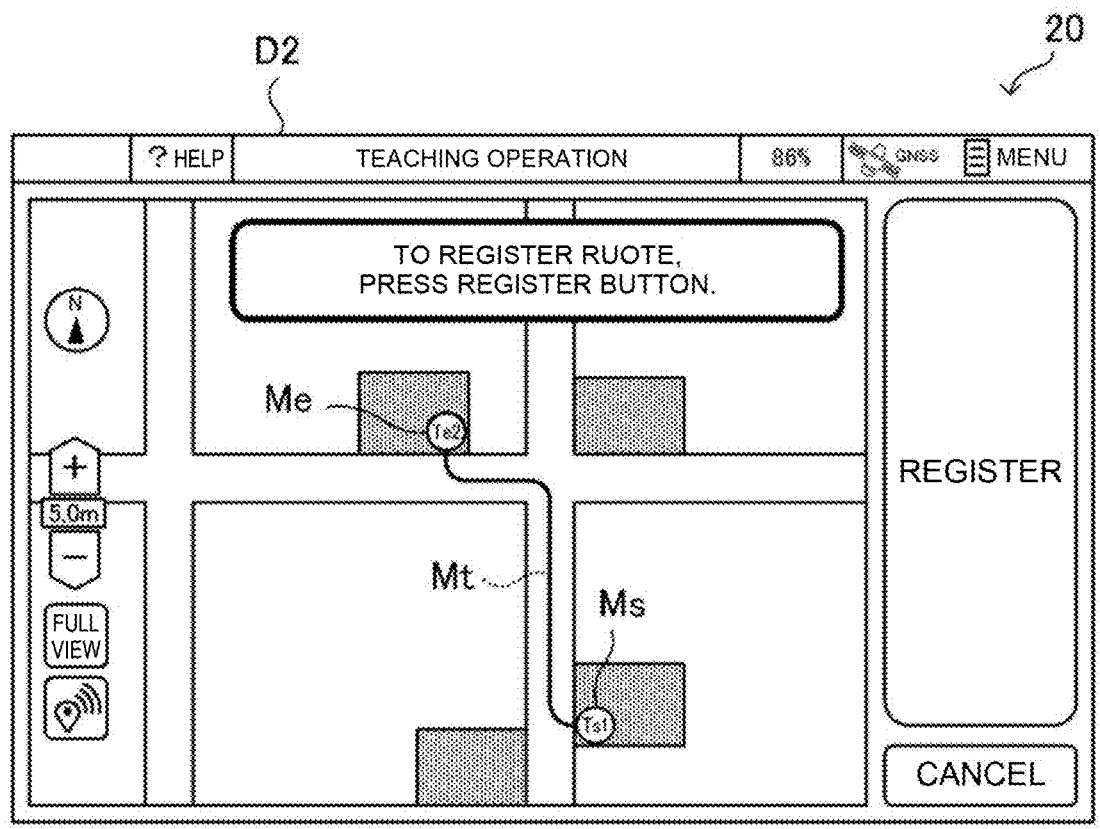
FIG. 6C is a view illustrating an example of the teaching operation screen displayed on the operation terminal according to an embodiment of the present disclosure.

When the reception processing unit 212 receives the end operation from the operator, the reception processing unit 212 displays a route end point image Me in which the route end point Te2 is indicated at the exit/entrance H2 of the field F2 on the map of the teaching operation screen D2 illustrated in FIG. 6C.

Figure 7:
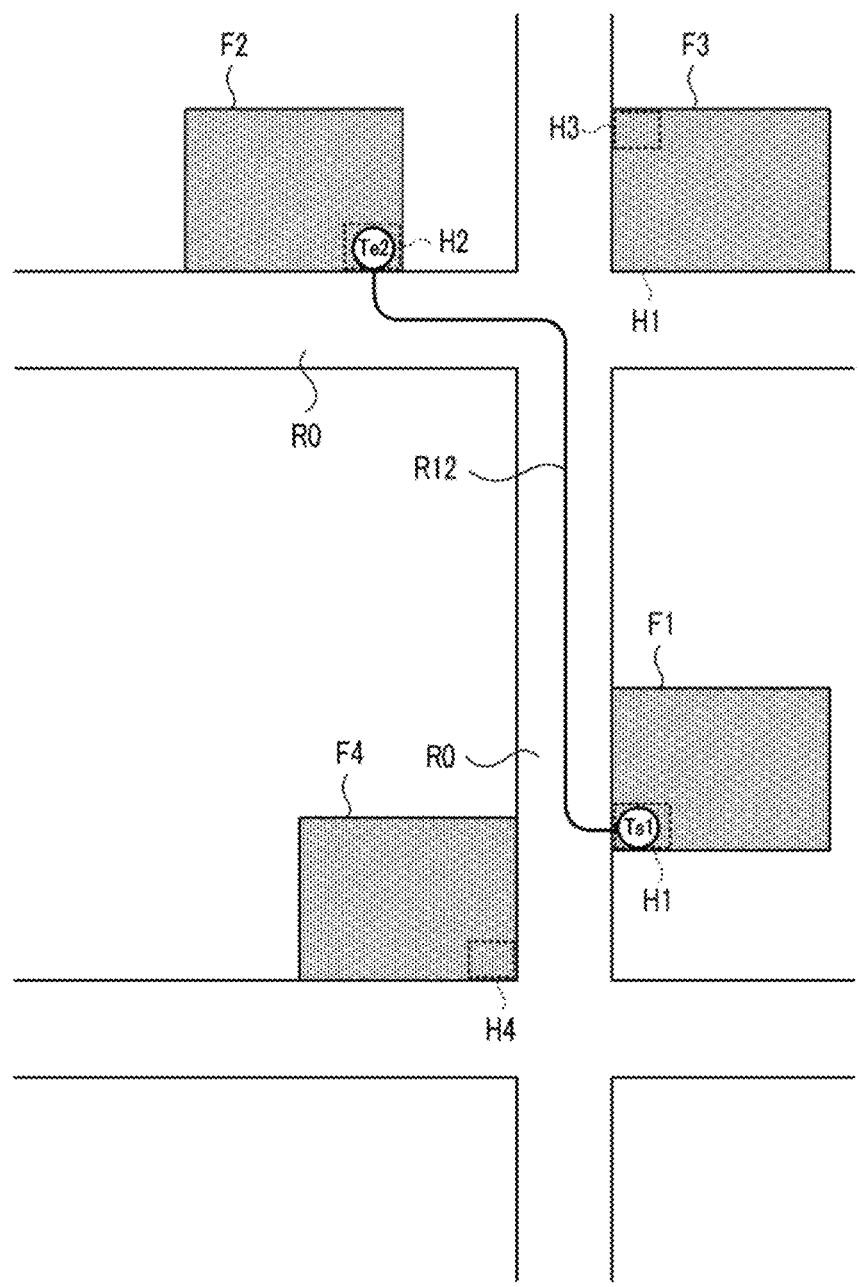
FIG. 7 is a view illustrating an example of the inter-field route for the work vehicle according to an embodiment of the present disclosure.

When the reception processing unit 212 receives the end operation from the operator, the generation processing unit 214 generates the inter-field route R12 on which the work vehicle 10 is caused to automatically travel between the field F1 and the field F2, based on the position information of the work vehicle 10 acquired by the acquisition processing unit 213. Specifically, the generation processing unit 214 generates the inter-field route R12 that connects the route start point Ts1 at the exit/entrance H1 of the field F1 and the route end point Te2 at the exit/entrance H2 of the field F2 and passes the road R0, as illustrated in FIG. 7. The generation processing unit 214 displays a route image Mt (solid line) of the generated inter-field route R12 on the map of the teaching operation screen D2 illustrated in FIG. 6C.

The generation processing unit 214 notifies the operator whether to register the generated inter-field route R12 on the teaching operation screen D2 illustrated in FIG. 6C. When the operator confirms the inter-field route R12 on the teaching operation screen D2 and presses the registration button, the generation processing unit 214 acquires an instruction to register the inter-field route R12. Upon acquiring a registration instruction, the generation processing unit 214 registers the inter-field route R12 in association with the field F1 and the field F2.

Figures 8, 9:
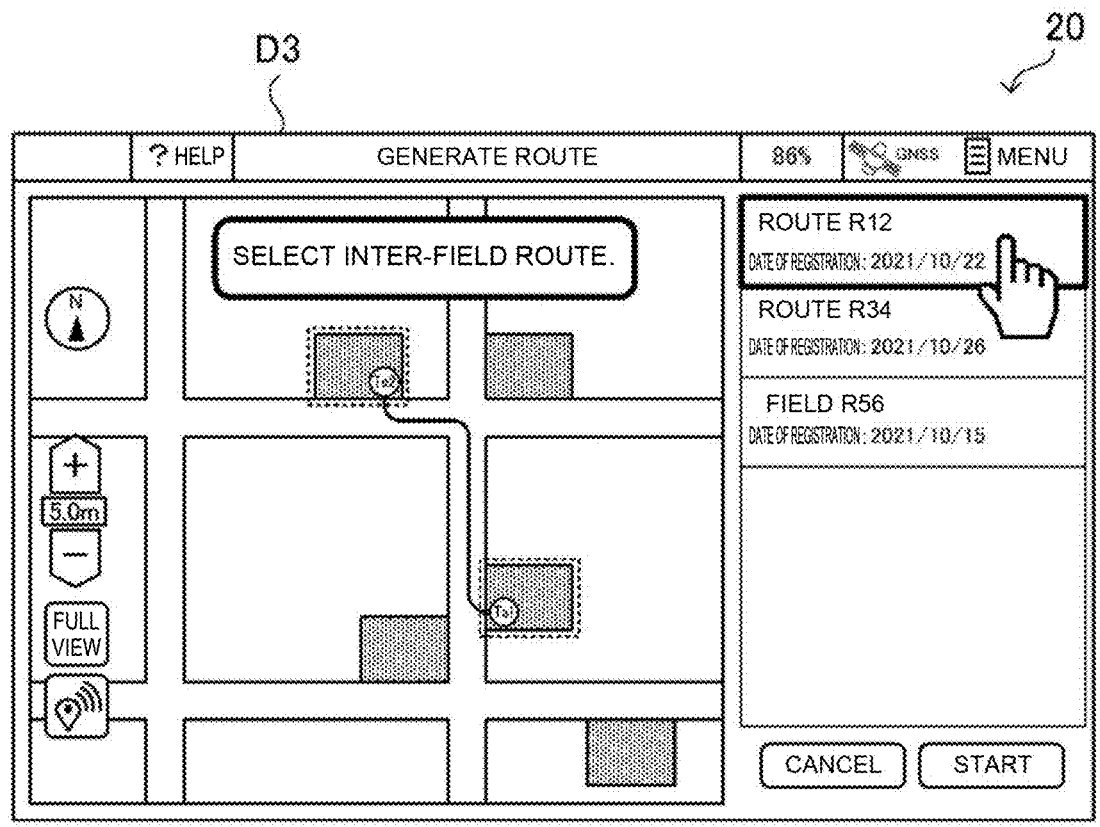
FIG. 8 is a table illustrating an example of an inter-field route information table according to an embodiment of the present disclosure.
FIG. 9 is a view illustrating an example of the operation screen displayed on the operation terminal according to an embodiment of the present disclosure.

Specifically, the generation processing unit 214 registers the inter-field route R12 in an inter-field route information table E1. FIG. 8 is a table illustrating an example of the inter-field route information table E1. The inter-field route information table E1 includes a route ID, a start field, an end field, position information, speed information, or the like. The route ID is identification information of the inter-field route. A route ID "R001" indicates the inter-field route R12. The start field is information indicating the field F corresponding to the route start point of the inter-field route, and the end field is information indicating the field F corresponding to the route end point of the inter-field route. The position information is information indicating a point of the inter-field route, and is information of a coordinate position acquired in a predetermined cycle (at sampling intervals). The speed information is travel speed of the work vehicle 10 when the work vehicle 10 is caused to perform teaching traveling on the inter-field route, and is information of the travel speed for each coordinate position. Each time the operator selects a plurality of fields F and performs a teaching operation, the generation processing unit 214 registers the generated inter-field route in association with the fields F in the inter-field route information table E1.

In causing the work vehicle 10 to start automatic traveling, the operator selects a plurality of fields and also selects an inter-field route on which the work vehicle 10 is caused to automatically travel between the fields from inter-field routes registered in the inter-field route information table E1. For example, in the operation screen D3 illustrated in FIG. 9, when the operator selects the field F1 and the field F2, the operation control unit 21 displays a list of the inter-field routes registered in the inter-field route information table E1 and receives a selection operation of selecting the inter-field routes from the operator. Although not illustrated in the drawings, the operation control unit 21 receives an operation of selecting the target route R1 for the field F1 (see FIG. 4A) and the target route R2 for the field F2 (see FIG. 4B) on the operation screen D3.

The operation control unit 21 determines whether the inter-field route connecting the field F1 and the field F2 is registered in the inter-field route information table E1, and displays, when the inter-field route is registered in the inter-field route information table E1, the inter-field route on the operation screen D3.

When the operator performs a selection operation of selecting the field F1 and the field F2, a selection operation of selecting the target route R1 in the field F1 and the target route R2 in the field F2, and a selection operation of selecting the inter-field route R12 on which the work vehicle 10 moves between the field F1 and the field F2 and then presses the start button (see FIG. 9), the output processing unit 215 outputs route data of the target routes and the inter-field route to the work vehicle 10. Note that operation control unit 21 may be configured to extract and set, when the operator selects the field F1 and the field F2, the inter-field route R12 that connects the field F1 and the field F2 from the inter-field routes registered in the inter-field route information table E1. In this case, the selection operation of selecting the inter-field route performed by the operator can be omitted.

Herein, the output processing unit 215 outputs the route data including the target route R1 (FIG. 4A) that is a work route in the field F1, the target route R2 (FIG. 4B) that is a work route in the field F2, and the inter-field route R12 (see FIG. 7) that is an inter-field route that connects the field F1 and the field F2 to the work vehicle 10.

The work vehicle 10 is configured such that the route data of the target routes and the inter-field route generated at the operation terminal 20 is transferred to the work vehicle 10 and is stored in the storage unit 12 and the work vehicle 10 can autonomously travel in accordance with the target routes and inter-field route while the current position of the work vehicle 10 is detected by the positioning antenna 164. Note that the current position of the work vehicle 10 usually matches a position of the positioning antenna 164.

The work vehicle 10 is configured to automatically travel in the field F1 when the current position thereof matches the traveling start point S1 in the field F1 (see FIG. 4A) and to automatically travel in the field F2 when the current position thereof corresponds to the traveling start point S2 in the field F2 (see FIG. 4B). The work vehicle 10 is configured to automatically travel on the inter-field route R12 when the current position thereof matches the route start point Ts1 at the exit/entrance H1 of the field F1 (see FIG. 7).

For example, in a case where the current position thereof matches the traveling start point S1 in the field F1, when the start button is pressed on the operation screen (not illustrated) by the operator and a traveling start instruction is given to the work vehicle 10, automatic traveling on the target route R1 is started by the traveling processing unit 111 of the work vehicle 10.

The traveling processing unit 111 causes the work vehicle 10 to automatically travel from the traveling start point S1 to the traveling end point G1 in accordance with the target route R1 in the field F1 (see FIG. 4A). When the work vehicle 10 reaches the traveling end point G1, the operator causes the work vehicle 10 to move from the traveling end point G1 to the route start point Ts1. Note that, as in an embodiment (see FIG. 12A) that will be described later, the operation control unit 21 may be configured to generate a route (interpolation route r31) on which the work vehicle 10 is caused to automatically travel from the traveling end point G1 to the route start point Ts1. In this case, when the work vehicle 10 reaches the traveling end point G1, the work vehicle 10 automatically travels from the traveling end point G1 to the route start point Ts1 in accordance with the interpolation route r31.

When the current position of the work vehicle 10 matches the route start point Ts1, the traveling processing unit 111 causes the work vehicle 10 to automatically travel from the route start point Ts1 to the route end point Te2 of the field F2 in accordance with the inter-field route R12 (see FIG. 7). Note that, when the work vehicle 10 goes out of the field F1 onto the road R0, the traveling processing unit 111 temporarily stops the work vehicle 10 to check for safety.

The traveling processing unit 111 causes the work vehicle 10 to automatically travel, based on the position information, the speed information or the like associated with the inter-field route R12 (see FIG. 8). For example, the traveling processing unit 111 sets travel speed corresponding to the speed information (travel speed during teaching traveling) as upper limit speed and thus causes the work vehicle 10 to automatically travel while controlling the travel speed. Note that, when the traveling processing unit 111 detects an obstacle while the work vehicle 10 is automatically traveling on the road R0, the traveling processing unit 111 causes the work vehicle 10 to automatically travel in accordance with the inter-field route R12 while avoiding the obstacle.

The traveling processing unit 111 temporarily stops the work vehicle 10 to check for safety when the work vehicle 10 enters the field F2 from the road R0. When the work vehicle 10 reaches the route end point Te2, the operator causes the work vehicle 10 to move from the route end point Te2 to the traveling start point S2 in the field F2. Note that, as in an embodiment that will be described later (see FIG. 12B), the operation control unit 21 may be configured to generate a route (interpolation route r32) on which the work vehicle 10 is caused to automatically travel from the route end point Te2 to the traveling start point S2. In this case, upon reaching the route end point Te2, the work vehicle 10 automatically travels from the route end point Te2 to the traveling start point S2 in accordance with the interpolation route r32.

When the current position of the work vehicle 10 matches the traveling start point S2, the traveling processing unit 111 causes the work vehicle 10 to automatically travel from the traveling start point S2 to the traveling end point G2 in accordance with the target route R2 (see FIG. 4B). When the work vehicle 10 reaches the traveling end point G2, the traveling processing unit 111 finishes automatic traveling. As described above, the traveling processing unit 111 causes the work vehicle 10 to automatically travel in the field F1, thereafter, causes the work vehicle 10 to automatically travel on the inter-field route R12 from the field F1 to the field F2, and then, causes the work vehicle 10 to automatically travel in the field F2.

While the work vehicle 10 is automatically traveling, the operator can grasp the traveling state in the field F1, the traveling state on the road R0 that connects the field F1 and the field F2, and the traveling state in the field F2 at the operation terminal 20.

Note that the operation terminal 20 may be accessible to a web site of agricultural support services (agricultural support site) provided by a server (not illustrated) via the communication network N1. In this case, a browser program is executed by the operation control unit 21, so that the operation terminal 20 can function as an operation terminal of the server. The server includes each of the processing units described above and performs each processing.

[Automatic Traveling Processing]

Figure 10:
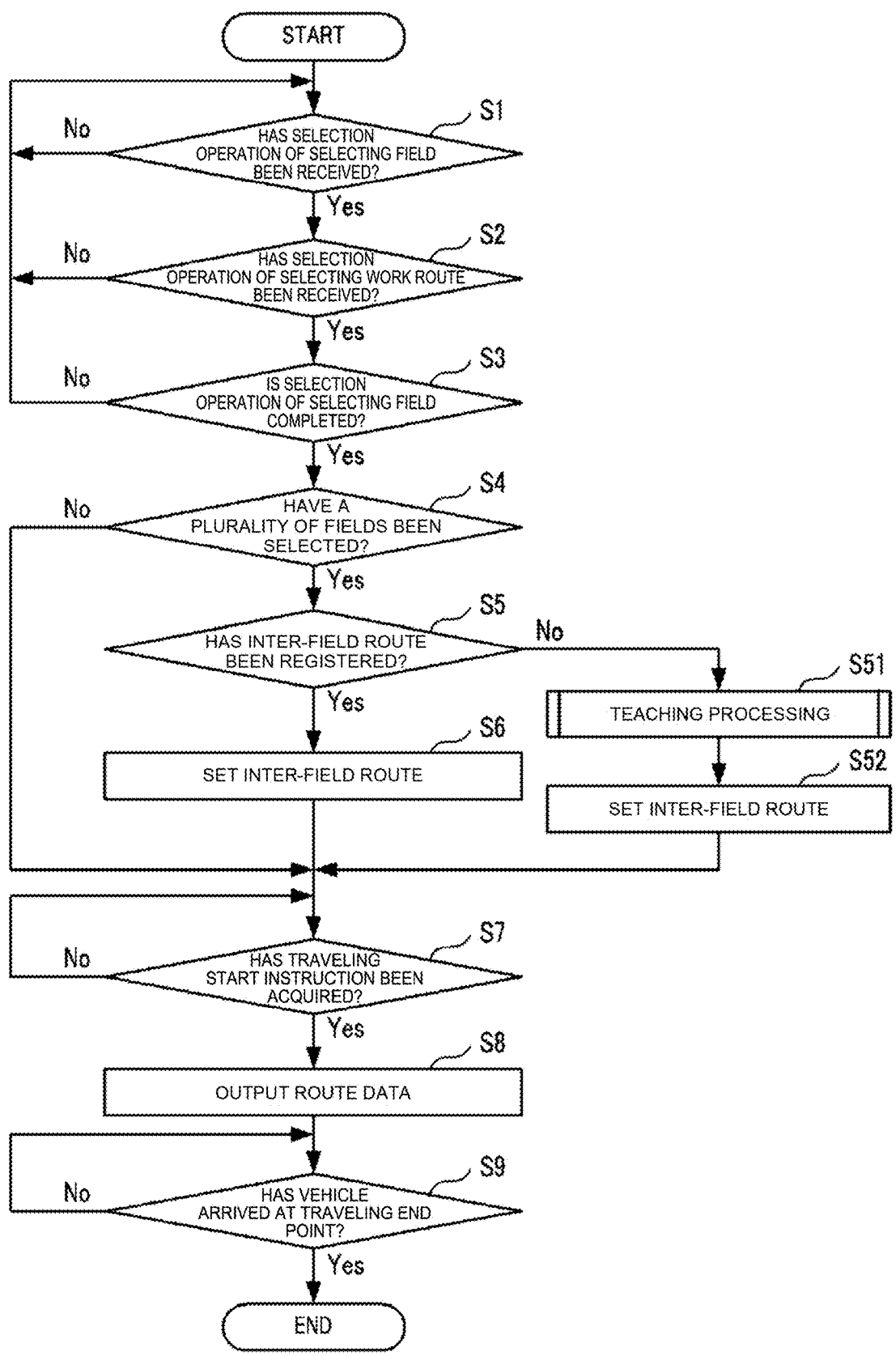
FIG. 10 is a flowchart illustrating an example of procedures of automatic traveling processing executed by an automatic traveling system according to an embodiment of the present disclosure.
Figure 11:
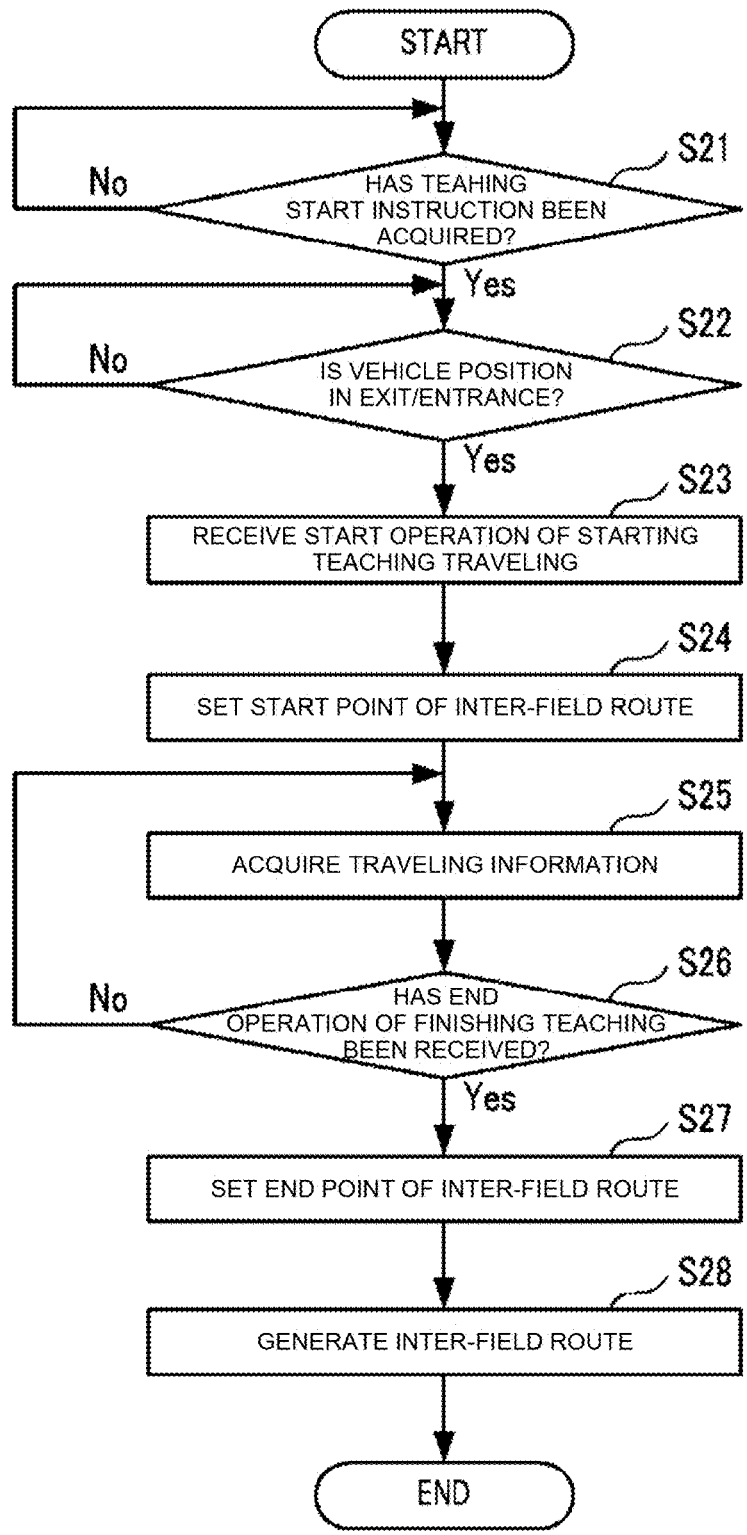
FIG. 11 is a flowchart illustrating an example of the procedures of the teaching processing performed by automatic traveling system according to an embodiment of the present disclosure.

With reference to FIG. 10 and FIG. 11, an example of the automatic traveling processing described above executed by the automatic traveling system 1 will be described below.

Note that the present disclosure can be understood as a disclosure of an automatic traveling method in which one or more steps included in the automatic traveling processing are executed. One or more steps included in the automatic traveling processing described herein may be omitted as appropriate. Note that each step in the automatic traveling processing may be executed in a different order as long as the same working effect is achieved. Furthermore, although a case where the operation control unit 21 executes each step in the automatic traveling processing will be described herein as an example, an automatic traveling method in which one or more processors execute steps in the automatic traveling processing in a distributed manner is also considered as another possible embodiment.

A route generation method according to the present disclosure is also included in the automatic traveling method. For example, teaching processing illustrated in FIG. 11 is an example of route generation processing, and a teaching method in which steps in the teaching processing are executed is an example of the route generation method of the present disclosure.

In Step S1, the operation control unit 21 of the operation terminal 20 determines whether a selection operation of selecting the field F has been received from the operator. When the operation control unit 21 receives the selection operation of selecting the field F (S1: Yes), the process proceeds to Step S2. The operation control unit 21 waits until the selection operation of selecting the field F is received (S1: No). Herein, the operator selects the field F1.

In Step S2, the operation control unit 21 determines whether a selection operation of selecting a work route has been received from the operator. When the operation control unit 21 receives the selection operation of selecting the work route (S2: Yes), the process proceeds to Step S3. When the operation control unit 21 has not received the selection operation of selecting the work route (S2: No), the process returns to Step S1. Herein, the operator selects the target route R1 (see FIG. 4A) assuming the field F1 as a work route.

In Step S3, the operation control unit 21 determines whether the selection operation of selecting the field F is completed. For example, when the operator selects the field F1 and the target route R1 and then performs a completion operation (S3: Yes), the operation control unit 21 causes the process to proceed to Step S4. When the selection operation of selecting the field F is not completed (S3: No), the operation control unit 21 causes the process to return to Step S1.

Returning to Step S1, the operation control unit 21 determines whether the selection operation of selecting the field F has been received from the operator. Herein, the operation control unit 21 receives an operation of selecting the field F2 from the operator. In subsequent Step S2, the operation control unit 21 receives an operation of selecting the target route R2 (see FIG. 4B) as the work route corresponding to the field F2 from the operator.

In Step S4, the operation control unit 21 determines whether the operator has selected a plurality of fields F. When the operator has selected a plurality of fields F (S4: Yes), the operation control unit 21 causes the process to proceed to Step S5. On the other hand, when the operator has selected a single field F (S4: No), the operation control unit 21 causes the process to proceed to Step S7.

In Step S5, the operation control unit 21 determines whether an inter-field route that connects the plurality of fields selected by the operator has been already registered in the inter-field route information table E1 (see FIG. 8). When the inter-field route has been already registered (S5: Yes), the operation control unit 21 causes the process to proceed to Step S6. On the other hand, if the inter-field route has not been already registered (S5: No), the operation control unit 21 causes the process to proceed to Step S51 (teaching processing that will be described later). When the process proceeds to Step S51, the operation control unit 21 executes processing of generating an inter-field route (S51) and sets the generated inter-field route as an inter-field route that connects the plurality of fields that have been selected by the operator (S52). Herein, the operation control unit 21 sets the inter-field route R12 generated by the teaching processing as the inter-field route that connects the field F1 and the field F2 (S52). Thereafter, the operation control unit 21 causes the process to proceed to Step S7.

In Step S6, the operation control unit 21 sets the inter-field route that has been selected by the operator or the inter-field route that has been automatically extracted, among the inter-field routes that have been already registered in the inter-field route information table E1 (see FIG. 8), as the inter-field route that connects the plurality of fields that have been selected by the operator. Thereafter, the operation control unit 21 causes the process to proceed to Step S7.

In Step S7, the operation control unit 21 determines whether an operation of instructing to start traveling has been received from the operator. When the operation control unit 21 receives the operation of instructing to start traveling from the operator (S7: Yes), the operation control unit 21 causes the process to proceed to Step S8. The operation control unit 21 waits until the operation control unit 21 receives the operation of instructing to start traveling from the operator (S7: No).

In Step S8, the operation control unit 21 outputs the route data to the work vehicle 10. Herein, the operation control unit 21 outputs the route data including the target route R1 that is a work route in the field F1 (see FIG. 4A), the target route R2 that is a work route in the field F2 (see FIG. 4B), and the inter-field route R12 that is an inter-field route that connects the field F1 and the field F2 (see FIG. 7) to the work vehicle 10.

When the work vehicle 10 acquires the route data, the work vehicle 10 starts automatic traveling in accordance with an operation performed by the operator. Thus, when the work vehicle 10 automatically travels in accordance with the target route R1 from the traveling start point S1 to the traveling end point G1 in the field F1 (see FIG. 4A) and completes a work in the field F1, the work vehicle 10 automatically travels on the road R0 from the route start point Ts1 in the field F1 to the route end point Te2 in the field F2 (see FIG. 7). When the work vehicle 10 reaches the route end point Te2, the work vehicle 10 automatically travels from the traveling start point S2 to the traveling end point G2 in the field F2 (see FIG. 4B) to finish the work in the field F2.

In Step S9, the operation control unit 21 determines whether the work vehicle 10 has reached the traveling end point. Herein, the traveling end point is the traveling end point G2 of the field F2 (see FIG. 4B). When the work vehicle 10 reaches the traveling end point (S9: Yes), the operation control unit 21 finishes the process. The operation control unit 21 waits until the work vehicle 10 reaches the traveling end point (S9: No).

[Teaching Processing]

FIG. 11 is a flowchart illustrating an example of procedures of the teaching processing (Step S51 in FIG. 10). Herein, it is assumed that the operator has selected the field F1 and the field F2 as target fields of the inter-field route.

In the teaching processing, first, in Step S21, the operation control unit 21 determines whether a teaching operation start instruction has been acquired from the operator. When the operation control unit 21 acquires the teaching operation start instruction from the operator (S21: Yes), the operation control unit 21 causes the process to proceed to Step S22. The operation control unit 21 waits until the operation control unit 21 acquires the teaching operation start instruction from the operator (S21: No).

In Step S22, the operation control unit 21 determines whether the current position of the work vehicle 10 is located at the exit/entrance of the field F. Herein, the operation control unit 21 determines whether the work vehicle 10 is located at the exit/entrance H1 of the field F1 (see FIG. 4A). When the current position of the work vehicle 10 is at the exit/entrance of the field F (S22: Yes), the operation control unit 21 causes the process to proceed to Step S23. The operation control unit 21 waits until the current position of the work vehicle 10 is located at the exit/entrance of the field F (S22: No).

In Step S23, the operation control unit 21 receives a teaching traveling start operation. For example, when the operator presses the start button on the teaching operation screen D2 illustrated in FIG. 6A, the operation control unit 21 receives the teaching traveling start operation.

Next, in Step S24, the operation control unit 21 sets a start point of the inter-field route (route start point). Herein, when the operation control unit 21 receives the start operation, the operation control unit 21 sets the current position of the work vehicle 10 located at the exit/entrance H1 of the field F1 as the route start point Ts1 (see FIG. 6A). Thus, the operator can perform an operation of teaching traveling.

For example, the operator brings in the operation terminal 20 to the work vehicle 10 and manually causes the work vehicle 10 to travel on the road R0 from the field F1 to the field F2 (see FIG. 3) while checking the guide route Mr displayed on the operation terminal 20 (see FIG. 6A).

Next, in Step S25, the operation control unit 21 acquires travel information (position information, travel speed information, road information, or the like) of the work vehicle 10 while the operator causes the work vehicle 10 to perform teaching traveling.

Next, in Step S26, the operation control unit 21 determines whether a teaching traveling end operation has been received from the operator. When the operation control unit 21 receives the teaching traveling end operation from the operator (S26: Yes), the operation control unit 21 causes the process to proceed to Step S27. The operation control unit 21 continues processing of acquiring the travel information in accordance with teaching traveling caused to be performed by the operator (S26: No) until the teaching traveling end operation is received from the operator. For example, when the work vehicle 10 reaches the exit/entrance H2 of the field F2, the operator performs a teaching operation end operation (see FIG. 6B).

In Step S27, the operation control unit 21 sets an end point of the inter-field route (route end point). Herein, when the operation control unit 21 receives the end operation, the operation control unit 21 sets the current position of the work vehicle 10 at the exit/entrance H2 of the field F2 as the route end point Te2 (see FIG. 6C).

Next, in Step S28, the operation control unit 21 generates an inter-field route. Specifically, the operation control unit 21 generates the inter-field route R12 on which the work vehicle 10 is caused to automatically travel between the field F1 and the field F2, based on the position information of the work vehicle 10. For example, as illustrated in FIG. 7, the operation control unit 21 generates the inter-field route R12 that connects the route start point Ts1 of the exit/entrance H1 of the field F1 and the route end point Te2 of the exit/entrance H2 of the field F2 and passes the road R0.

The operation control unit 21 notifies the operator whether to register the generated inter-field route R12 on the teaching operation screen D2 illustrated in FIG. 6C. When the operator confirms the inter-field route R12 on the teaching operation screen D2 and presses the registration button, the operation control unit 21 acquires an instruction to register the inter-field route R12 and registers the inter-field route R12 in association with the field F1 and the field F2 (see FIG. 8).

The operation control unit 21 executes the teaching processing in the manner described above and sets the inter-field route R12 generated in the teaching processing as the inter-field route between the field F1 and the field F2 in Step S52 (see FIG. 10).

In the manner described above, the operation control unit 21 executes the automatic traveling processing. The work vehicle 10 performs a predetermined work while automatically traveling in each of a plurality of fields and automatically travels between the fields, based on the route data transferred from the operation control unit 21. Note that the teaching processing illustrated in FIG. 11 may be executed when the work vehicle 10 is caused to start a work and may be executed when the work vehicle 10 is not caused to perform a work.

As described above, the automatic traveling system 1 according to this embodiment receives a traveling operation performed by the operator, acquires, based on the traveling operation, the position information of the work vehicle 10 that travels on the road R0 (an example of a connecting road of the present disclosure) that connects the field F1 (an example of a first area of the present disclosure) and the field F2 (an example of a second area of the present disclosure), and generates, based on the position information, the inter-field route R12 (an example of the inter-field route of the present disclosure) on which the work vehicle 10 is caused to automatically travel between the field F1 and the field F2.

According to the configuration described above, a route on which a work vehicle is caused to automatically travel between a plurality of fields can be generated in accordance with a traveling operation performed by the operator (manual traveling operation). Thus, the work vehicle 10 can be reliably caused to automatically travel between the plurality of fields. In addition, work efficiency can be improved by enabling automatic travelling between a plurality of fields in a next operation by storing the inter-field route on which the work vehicle is manually caused to travel once. Thus, the work vehicle 10 can be caused to automatically perform works in a plurality of fields continuously.

[Other Embodiments]

The present disclosure is not limited to the embodiment described above, and may be the following embodiments.

Figure 12A:
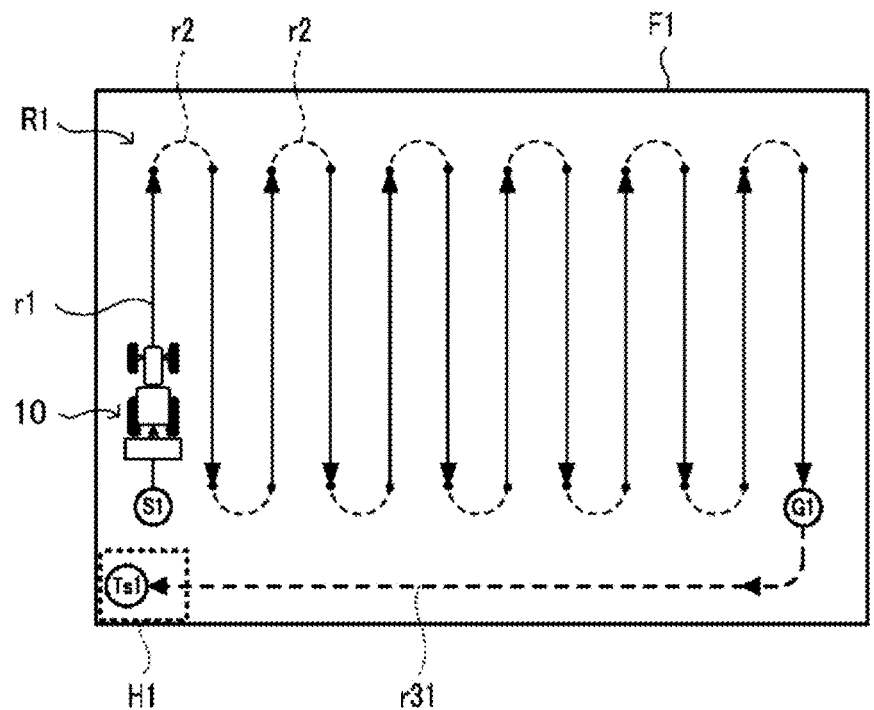
FIG. 12A is a view illustrating an example of an interpolation route for the work vehicle according to an embodiment of the present disclosure.

For example, as illustrated in FIG. 12A, the operation control unit 21 may be configured to generate a route (interpolation route r31) on which the work vehicle 10 is caused to automatically travel from the traveling end point G1 to the route start point Ts1. Specifically, when the operation control unit 21 sets the route start point Ts1 in the field F1 (see FIG. 6A), the operation control unit 21 generates the interpolation route r31 that connects the traveling end point G1 of the target route R1 in the field F1 and the route start point Ts1.

Figure 12B:
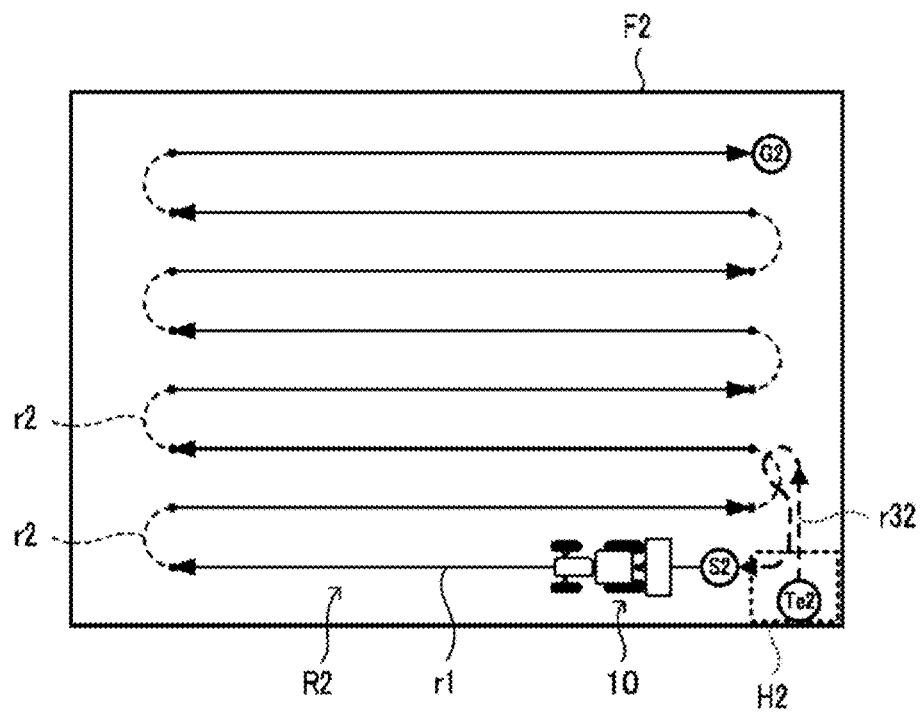
FIG. 12B is a view illustrating an example of the interpolation route for the work vehicle according to an embodiment of the present disclosure.

As illustrated in FIG. 12B, the operation control unit 21 may be configured to generate a route (interpolation route r32) on which the work vehicle 10 is caused to automatically travel from the route end point Te2 to the traveling start point S2. Specifically, when the operation control unit 21 sets the route end point Te2 in the field F2 (see FIG. 6C), the operation control unit 21 generates the interpolation route r32 that connects the route end point Te2 and the traveling start point S2 of the target route R2 in the field F2.

The operation control unit 21 registers the generated interpolation routes r31 and r32 in association with the respective inter-field routes R12 of the field F1 and the field F2. Thus, the work vehicle 10 can automatically travel on the entire route from the traveling start point S1 in the field F1 to the traveling end point G2 in the field F2. The interpolation route r31 is an example of a first interpolation route of the present disclosure, and the interpolation route r32 is an example of a second interpolation route of the present disclosure.

Note that each of the route start point Ts1 and the route end point Te2 of the inter-field route R12 may be set outside the field F1 and the field F2, respectively. In this case, the operation control unit 21 generates the interpolation route r31 on which the work vehicle 10 is caused to automatically travel from the traveling end point G1 in the field F1 to the route start point Ts1 outside the field F1 and the interpolation route r32 on which the work vehicle 10 is caused to automatically travel the work vehicle 10 from the route end point Te2 outside the field F2 to the traveling start point S2 in the field F2.

In a case where, after performing a work in the field F2, the work vehicle 10 moves to the field F1 and performs a work therein, the operation control unit 21 generates an interpolation route that connects the traveling end point G2 of the target route R2 and the route start point (the same point as the route end point Te2) in the field F2 and an interpolation route that connects the route end point (the same point as the route start point Ts1) and the traveling start point S1 of the target route R1 in the field F1. That is, in the present disclosure, when a first target route on which the work vehicle 10 is caused to automatically travel is set in the first field and a second target route on which the work vehicle 10 is caused to automatically travel is set in the second field, the operation control unit 21 generates the first interpolation route that connects a start point or an end point of the first target route to the first end point (route start point or route end point), and the second interpolation route that connects a start point or an end point of the second target route and the second end point (route start point or route end point).

Figure 25A:
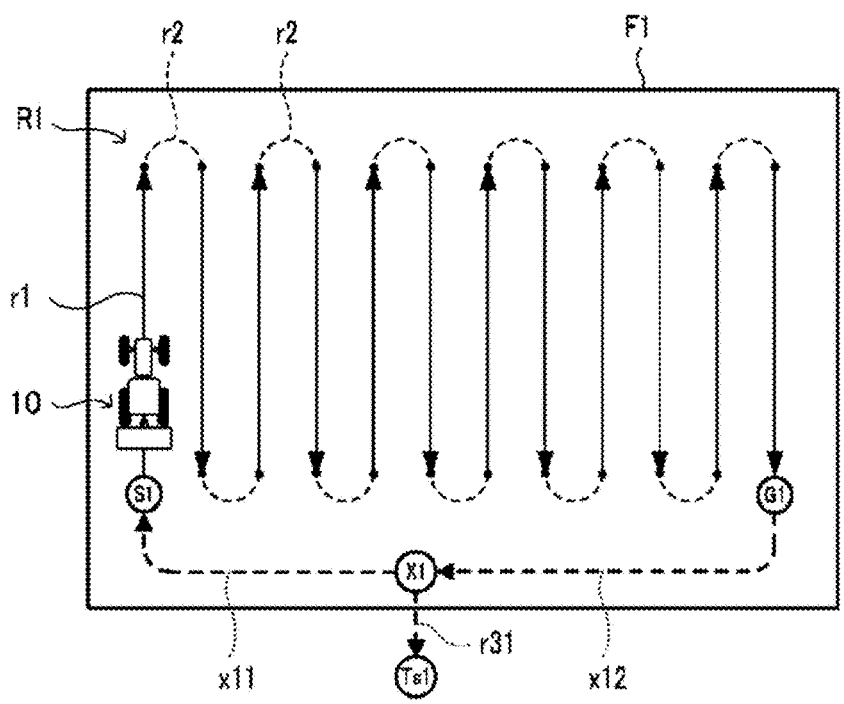
FIG. 25A is a view illustrating another example of the interpolation route for the work vehicle according to an embodiment of the present disclosure.
Figure 25B:
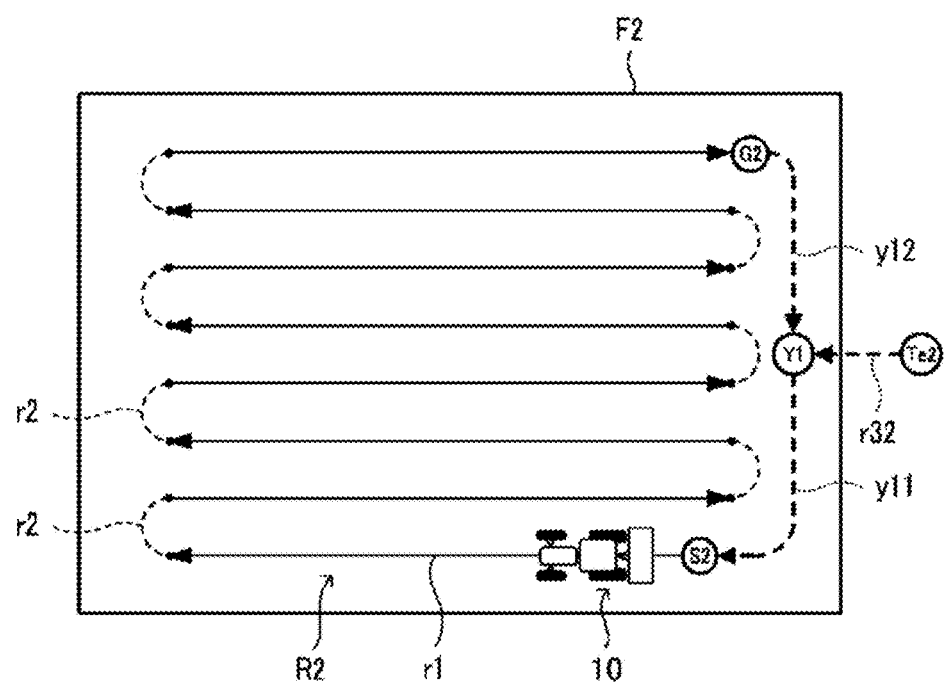
FIG. 25B is a view illustrating another example of an interpolation route for the work vehicle according to an embodiment of the present disclosure.

Incidentally, in the automatic traveling system 1, in fields, it is possible to separately set a point where the work vehicle 10 starts a work and points where the work vehicle starts and ends automatic traveling. For example, as illustrated in FIG. 25A, the operator can set the point (automatic traveling start point X1) where the work vehicle 10 starts automatic travelling at any position in the field F1, and as illustrated in FIG. 25B, the point (automatic traveling start point Y1) where the work vehicle 10 starts automatic travelling at any position in the field F2.

Note that, herein, the automatic traveling start points X1 and Y1 are the same as the points (automatic traveling end points) where the work vehicle 10 finishes automatic traveling, but the automatic traveling start point and the automatic traveling end point may be set at different points from each other. Herein, in FIG. 25A, "S1" corresponds to the work start point where the work vehicle 10 starts a work in the field F1, and "G1" corresponds to the work end point where the work vehicle 10 finishes the work in the field F1. In FIG. 25B, "S2" corresponds to the work start point where the work vehicle 10 starts a work in the field F2, and "G2" corresponds to the work end point where the work vehicle 10 finishes the work in the field F2.

In the configuration described above, the operation control unit 21 generates a moving route x11 from the automatic traveling start point X1 to the work start point S1 and a moving route x12 from the work end point G1 to the automatic traveling end point X1 in the field F1 and a moving route y11 from the automatic traveling start point Y1 to the work start point S2 and a moving route y12 from the work end point G2 to the automatic traveling end point Y1 in the field F2. Thus, the work vehicle 10 can automatically travel from the automatic traveling start point to the work start point and from the work end point to the automatic traveling end point in the field F1 and the field F2.

Herein, when the operation control unit 21 generates the inter-field route R12 that connects the field F1 and the field F2, the operation control unit 21 generates the interpolation route r31 on which the work vehicle 10 is caused to automatically travel from the automatic traveling end point X1 of the field F1 to the route start point Ts1 of the inter-field route R12 and the interpolation route r32 on which the work vehicle 10 is caused to automatically travel from the route end point Te2 of the inter-field route R12 to the automatic traveling start point Y1 of the field F2.

Thus, the work vehicle 10 automatically travels from the automatic traveling start point X1 on the moving route x11, the target route R1, and the moving route x12 in the field F1, and then, when the work vehicle 10 reaches the automatic traveling end point X1, automatically travels on the interpolation route r31 to the route start point Ts1 of the inter-field route R12 (see FIG. 25A). When the work vehicle 10 reaches the route start point Ts1, the work vehicle 10 automatically travels on the inter-field route R12 to the route end point Te2. When the work vehicle 10 reaches the route end point Te2, the work vehicle 10 automatically travels on the interpolation route r32 to the automatic traveling start point Y1 in the field F2, and automatically travels from the automatic traveling start point Y1 on the moving route y11, the target route R2, and the moving route y12 (see FIG. 25B). In the manner described above, automatic traveling in a plurality of fields and between the plurality of fields are realized.

Figure 26A:
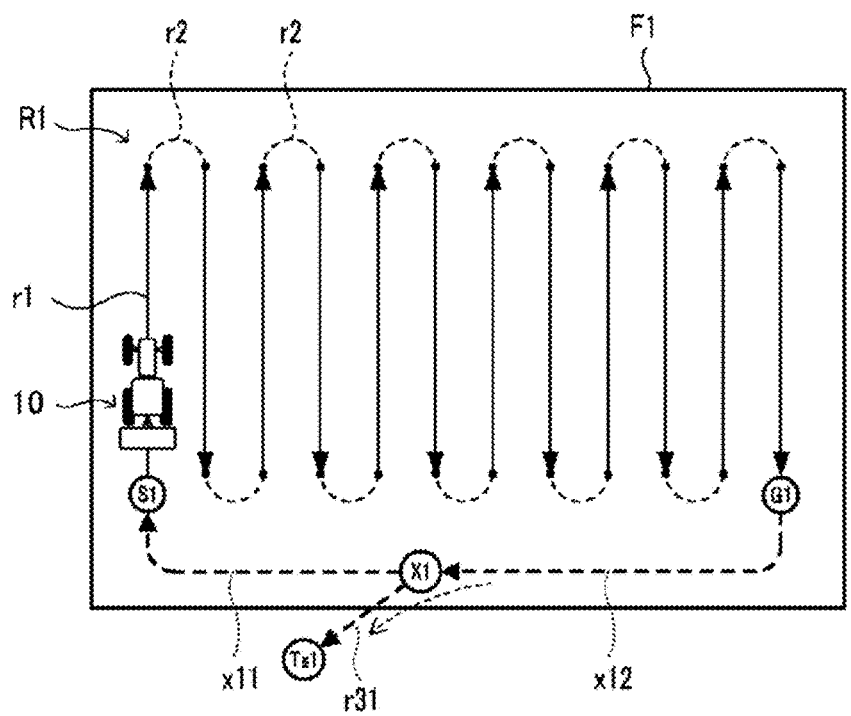
FIG. 26A is a view illustrating another example of the interpolation route for the work vehicle according to an embodiment of the present disclosure.
Figure 26B:
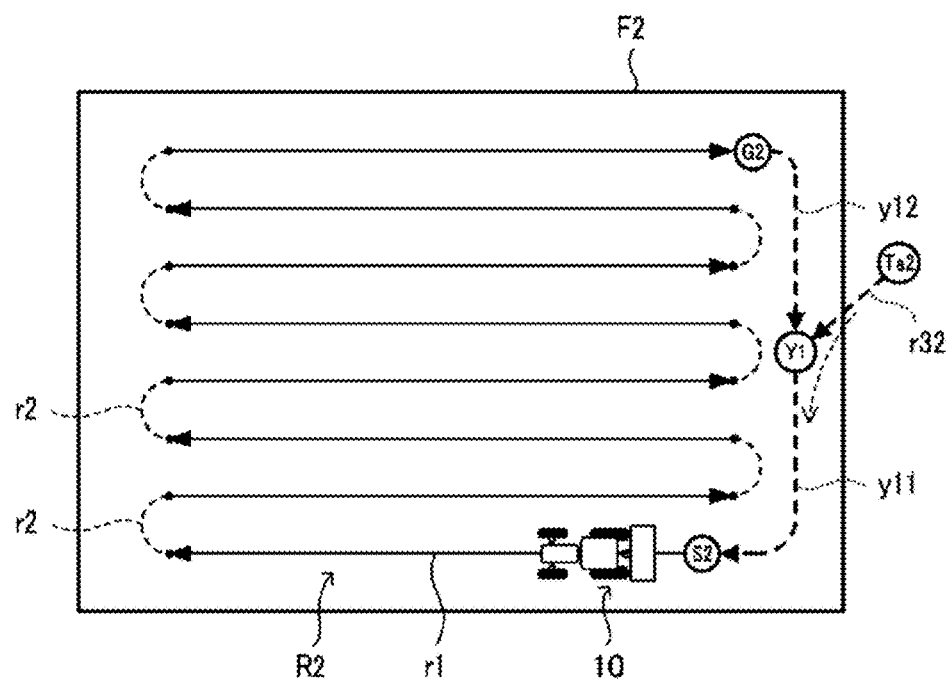
FIG. 26B is a view illustrating another example of an interpolation route for the work vehicle according to an embodiment of the present disclosure.

Note that the operation control unit 21 may be configured to set the route start point Ts1, based on the automatic traveling end point X1, and the route end point Te2, based on the automatic traveling start point Y1. For example, as illustrated in FIG. 26A, the route start point Ts1 may be set within a predetermined angle, based on an extension line of the moving route x12 that connects to the automatic traveling end point X1 as a reference. Thus, the work vehicle 10 can avoid unnecessary turning or the like when moving from the work end point G1 to the route start point Ts1. Similarly, as illustrated in FIG. 26B, the route end point Te2 may be set within a predetermined angle, based on an extension line of the moving route y11 that connects to the automatic traveling start point Y1 as a reference. Thus, the work vehicle 10 can avoid unnecessary turning or the like when moving from the route end point Te2 to the work start point S2.

Figure 13:
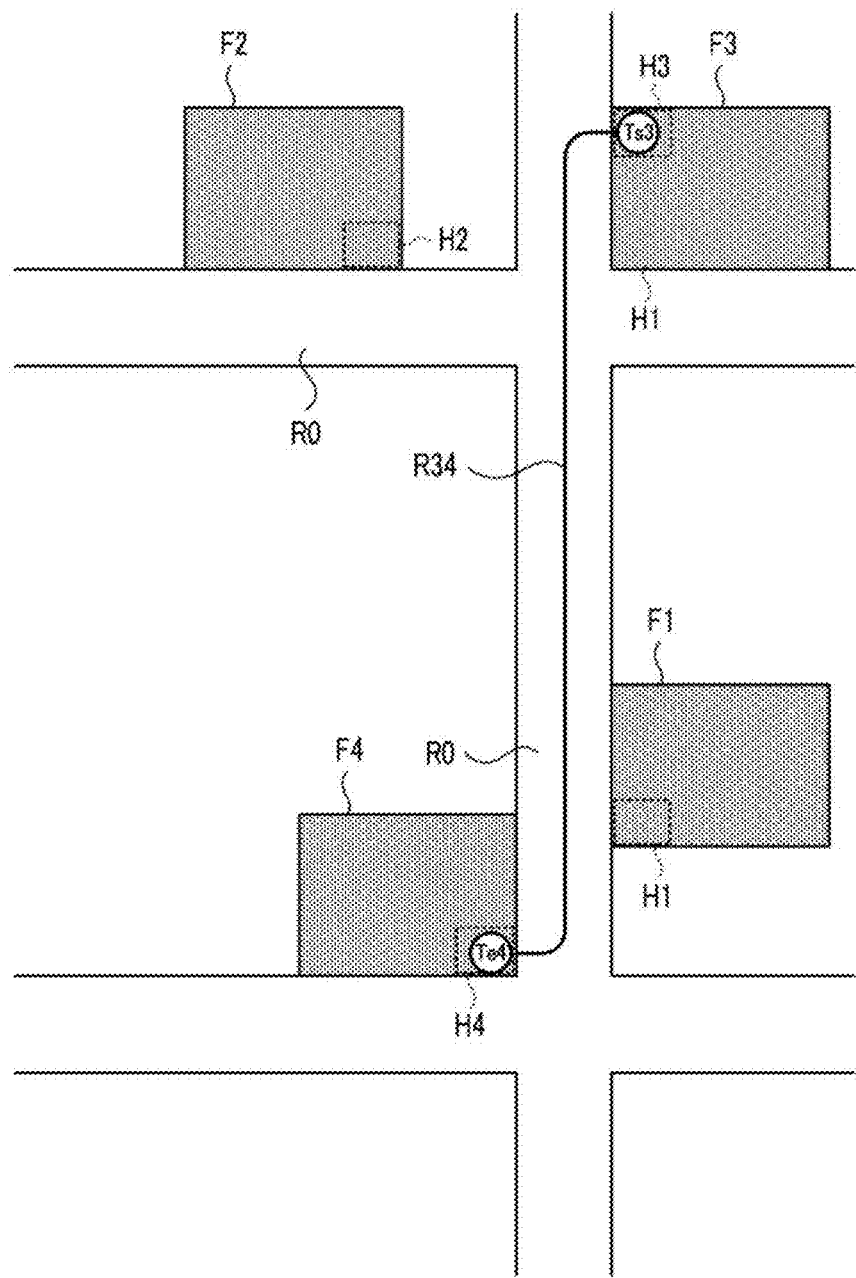
FIG. 13 is a view illustrating an example of the inter-field route for the work vehicle according to an embodiment of the present disclosure.

As another embodiment of the present disclosure, the operation control unit 21 may be configured to generate an inter-field route that connects a plurality of other fields using at least a portion of the inter-field routes that have been already registered. For example, when the inter-field route R12 (see FIG. 7) that connects the field F1 and the field F2 and an inter-field route R34 (see FIG. 13) that connects a field F3 and a field F4 are registered (see FIG. 8), using at least a portion of the inter-field route R12 and the inter-field route R34, the operation control unit 21 generates an inter-field route between other fields. Specifically, as illustrated in FIG. 14, the operation control unit 21 generates an inter-field route R13 between the field F1 and the field F3 using a partial route R12a that is a portion of the inter-field route R12 and a partial route R34a that is a portion of the inter-field route R34.

Figure 14:
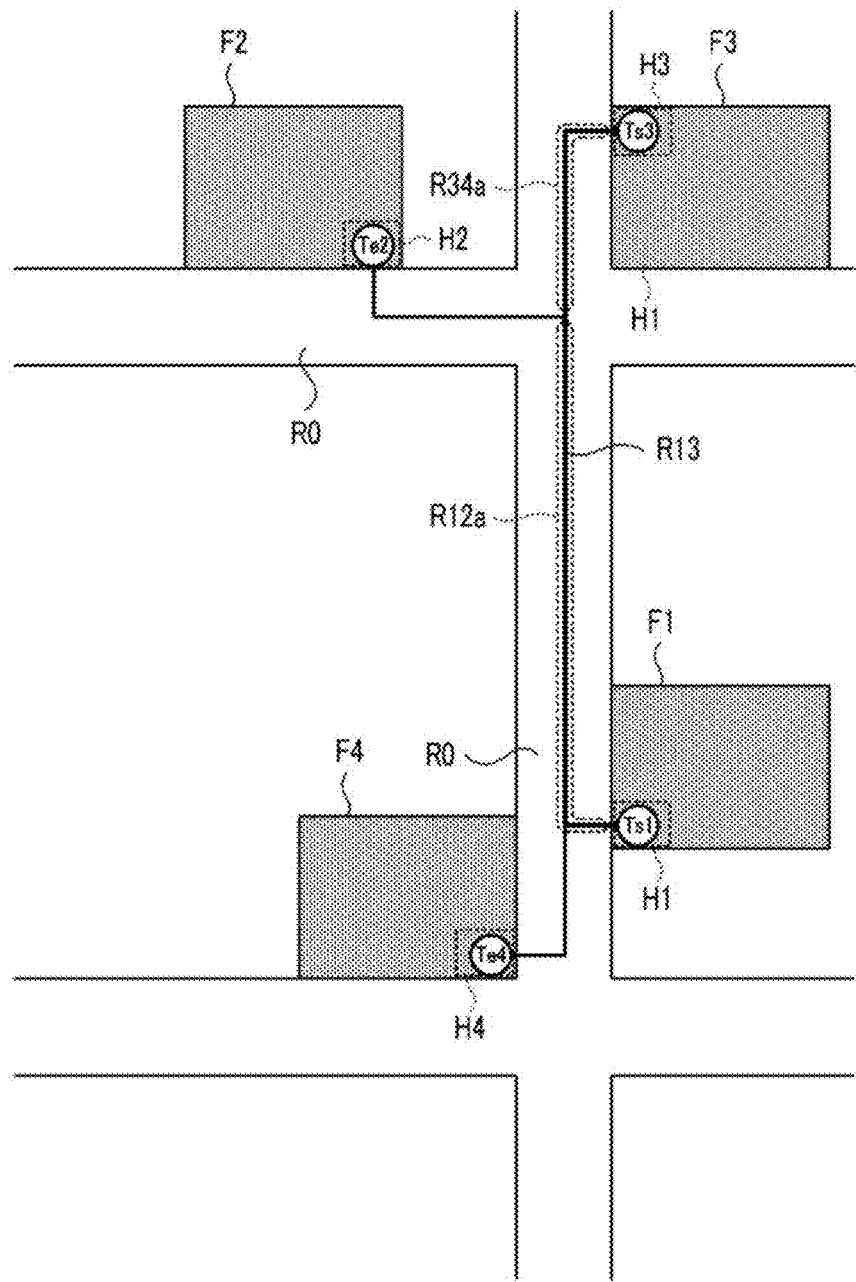
FIG. 14 is a view illustrating an example of the inter-field route for the work vehicle according to an embodiment of the present disclosure.

In an example illustrated in FIG. 14, the operation control unit 21 can generate a plurality of inter-field routes each of which interconnects corresponding ones of the fields F1 to F4 using the inter-field routes R12 and R34 that have been already registered.

Figure 15:
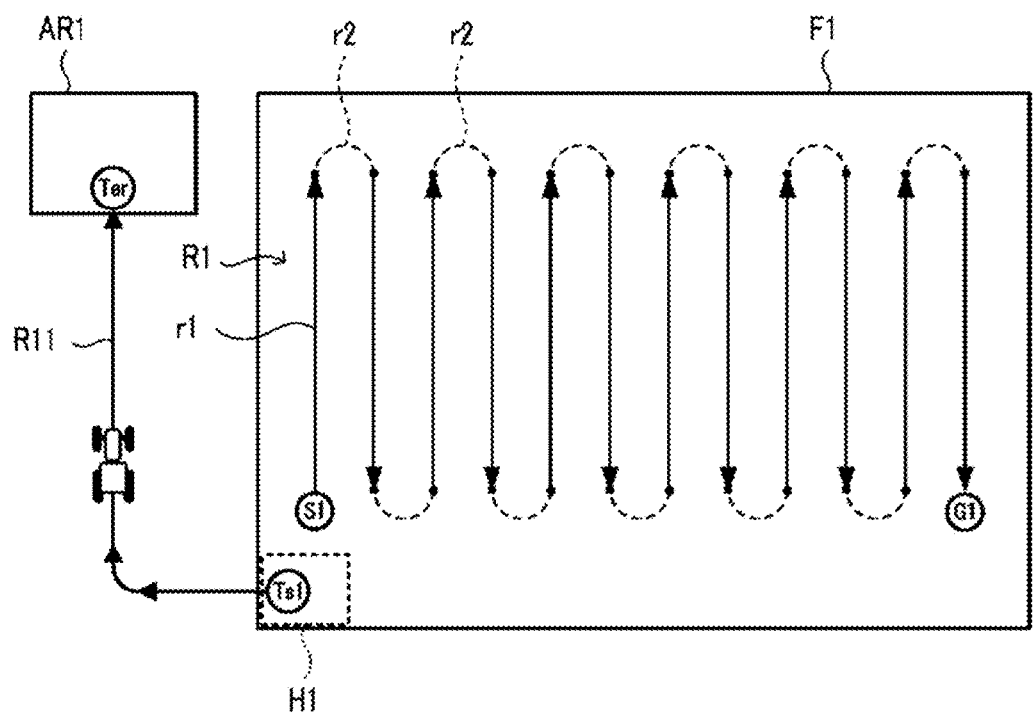
FIG. 15 is a view illustrating an example of the inter-area route for the work vehicle according to an embodiment of the present disclosure.

In the embodiments described above, the field F1 has been described an example of the first area of the present disclosure and the field F2 has been described as an example of the second area of the present disclosure, but the first area and the second area of the present disclosure are not limited thereto. For example, as illustrated in FIG. 15, the first area may be the field F1 and the second area may be a supply area AR1 where a supply material (fuel, a seedling, a fertilizer, a spraying material, or the like) is supplied to the work vehicle 10. The operation control unit 21 generates a route R11 (an example of an inter-area route of the present disclosure) that connects the field F1 and the supply area AR1 in accordance with the teaching operation performed by the operator.

For example, the work vehicle 10 automatically travels from the route start point Ts1 on the route R11 during a work in the field F1 and, when the work vehicle 10 reaches a route end point Ter, executes supply processing in the supply area AR1. When supply processing is completed, the work vehicle 10 automatically travels on the route R11 to return to the field F1 and resume the work. According to the configuration described above, the work vehicle 10 can be caused to automatically travel to the supply area AR1 during the work and automatically travel from the supply area AR1 to the field F1, so that work efficiency can be increased.

In the configuration described above, the work vehicle 10 may be caused to automatically travel from the field F1 to the supply area AR1 and automatically travel from the supply area AR1 to the field F2. In this case, the operation control unit 21 generates the route R11 that connects the field F1 and the supply area AR1 and a route that connects the supply area AR1 and the field F2. As described above, the operation control unit 21 may be configured to generate, when the work vehicle 10 moves from one field to another field via a relay point, a route that connects the one field and the relay point and a route that connects the relay point and the another field in accordance with the teaching operation performed by the operator. Note that the first area and the second area may be discharge areas where a discharge material (harvested materials or the like) is discharged from the work vehicle 10 and may be storage areas (barns or the like) for the work vehicle 10. That is, each of the first area and the second area is a field, a supply area where a supply material is supplied to the work vehicle 10, a discharge area where a discharge material is discharged from the work vehicle 10, or a storage area for the work vehicle 10.

As still another embodiment of the present disclosure, for example, the inter-field route R12 generated by performing teaching traveling from the field F1 to the field F2 may be used as a route on which the work vehicle 10 moves from field F1 to field F2, and may be used as a route on which the work vehicle 10 moves from the field F2 to the field F1.

In the embodiment described above, the operation control unit 21 generates an inter-field route of the road R0 that connects a plurality of fields F, based on a teaching operation performed by the operator, but the present disclosure is not limited thereto. As still another embodiment, the operation control unit 21 may be configured to generate the inter-field route, based on a traveling locus of traveling of the work vehicle 10 in the past. For example, in a case where works are performed in the field F1 and the field F2 by the work vehicle 10, when a work in field F1 is completed, the operator manually causes the work vehicle 10 to travel from the field F1 to the field F2 to perform a work in field F2. The operation control unit 21 generates a route between the field F1 and the field F2, based on the travel locus of traveling of the work vehicle 10 during the work. As described above, the operation control unit 21 may be configured to generate the inter-field route, based on a travel locus of traveling of the work vehicle 10 manually caused by the operator during a normal operation.

The operation terminal 20 according to this embodiment may be mounted on the work vehicle 10 and may be arranged outside the work vehicle 10. Each processing unit of the operation terminal 20 may be included in the vehicle control device 11 of the work vehicle 10. That is, in the embodiments described above, the operation terminal 20 corresponds to a route generation system according to the present disclosure, and the route generation system according to the present disclosure may be configured of a single body of the work vehicle 10. In addition, the route generation system according to the present disclosure may be configured to include the work vehicle 10 and the operation terminal 20. Moreover, each processing unit of the operation terminal 20 may be included in a server that can communicate with the work vehicle 10.

[Specific Example of Route Generation Method]

Herein, another example of an inter-field route generation method will be described. For example, while the work vehicle 10 is traveling on the road R0 that connects the field F1 and the field F2 in accordance with the teaching operation performed by the operator (teaching traveling), the operation control unit 21 acquires the position information of the work vehicle 10 from the work vehicle 10 in a predetermined cycle (at sampling intervals) and stores the position information of the work vehicle 10 in the storage unit 22. When teaching traveling is completed, the operation control unit 21 generates the inter-field route R12, based on the position information stored in the storage unit 22.

Figure 16:
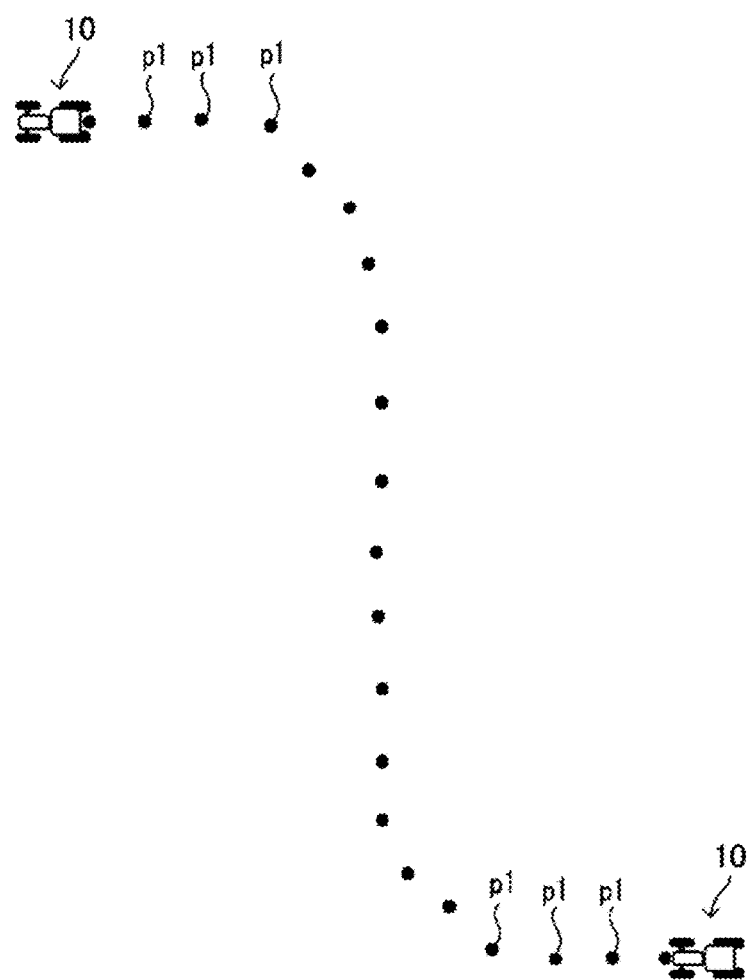
FIG. 16 is a view illustrating an example of position information acquired by teaching travel according to an embodiment of the present disclosure.
Figure 17:
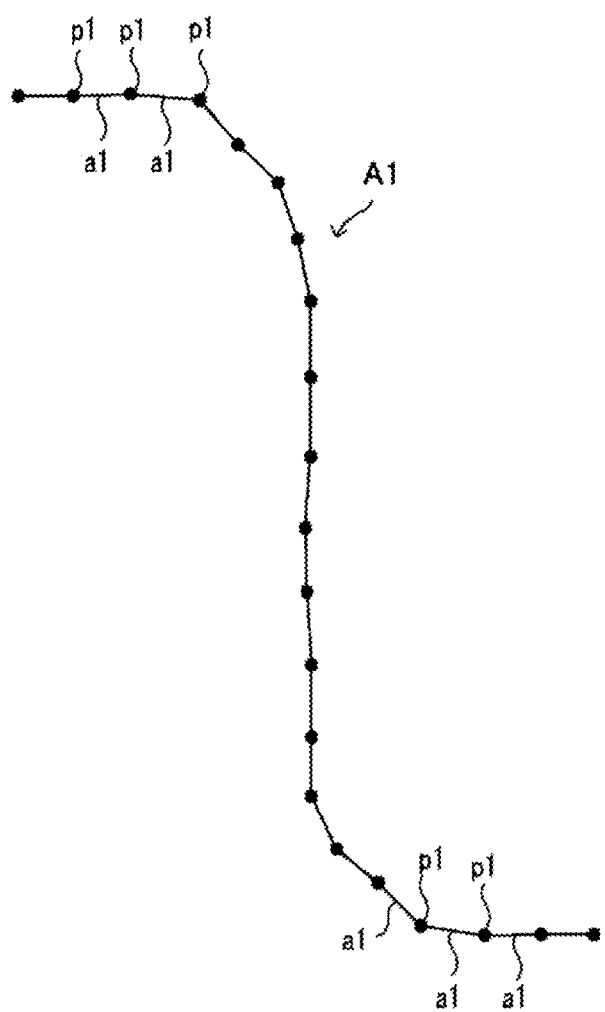
FIG. 17 is a view illustrating an example of the inter-field route for the work vehicle according to an embodiment of the present disclosure.

FIG. 16 illustrates points p1 (position coordinates) acquired by the operation control unit 21 during teaching traveling. When the operation control unit 21 acquires position information of the points p1, the operation control unit 21 generates an inter-field route A1 by connecting adjacent ones of the points p1 with a straight line as illustrated in FIG. 17. As described above, the operation control unit 21 generates the inter-field route A1 by connecting a plurality of straight lines.

Figure 18A:
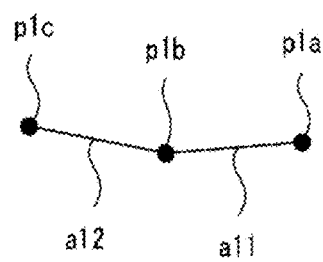
FIG. 18A is a view illustrating an example of a method for generating an inter-field route for a work vehicle according to an embodiment of the present disclosure.
Figure 18B:
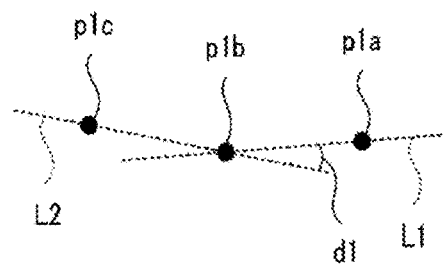
FIG. 18B is a view illustrating an example of the method for generating an inter-field route for a work vehicle according to an embodiment of the present disclosure.
Figure 18C:
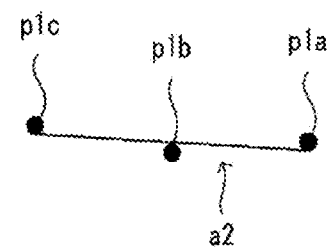
FIG. 18C is a view illustrating an example of the method for generating an inter-field route for a work vehicle according to an embodiment of the present disclosure.

As still another embodiment, the operation control unit 21 may be configured to generate an inter-field route by connecting an approximated straight line and an approximated curve, based on the acquired position information of the work vehicle 10. For example, as illustrated in FIG. 18A, a focus is on three points p1a, p1b, and p1c. As illustrated in FIG. 18A, the operation control unit 21 first connects the point p1a and the point p1b with a straight line a11 and connects the point p1b and the point p1c with a straight line a12. Next, as illustrated in FIG. 18B, the operation control unit 21 calculates an angle d1 between an extension line L1 of the straight line a11 and an extension line L2 of the straight line a12, that is, a deviation between the straight line a11 and the straight line a12. When the angle d1 (deviation) is less than a threshold, the operation control unit 21 generates an approximated straight line a2 of the points p1a, p1b, and p1c, as illustrated in FIG. 18C.

Figure 19A:
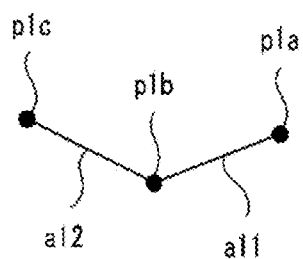
FIG. 19A is a view illustrating an example of the method for generating an inter-field route for a work vehicle according to an embodiment of the present disclosure.
Figure 19B:
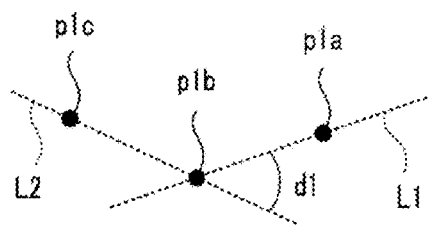
FIG. 19B is a view illustrating an example of the method for generating an inter-field route for a work vehicle according to an embodiment of the present disclosure.
Figure 19C:
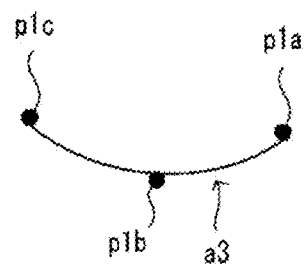
FIG. 19C is a view illustrating an example of the method for generating an inter-field route for a work vehicle according to an embodiment of the present disclosure.

Similarly, as illustrated in FIG. 19A, the operation control unit 21 connects the point p1a and the point p1b with the straight line a11 and the point p1b and the point p1c with the straight line a12. Next, as illustrated in FIG. 19B, the operation control unit 21 calculates the angle d1 between the extension line L1 of the straight line a11 and the extension line L2 of the straight line a12, that is, the deviation between the straight line a11 and the straight line a12. When the angle d1 (deviation) is equal to or larger than the threshold, the operation control unit 21 generates an approximated curve a3 of the points p1a, p1b, and p1c, as illustrated in FIG. 19C.

Figure 20:
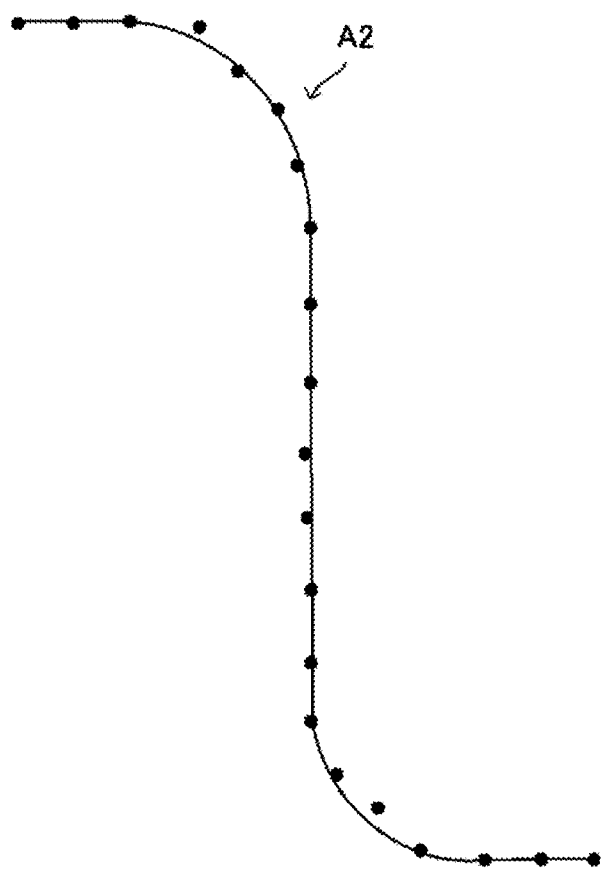
FIG. 20 is a view illustrating an example of the inter-field route for the work vehicle according to an embodiment of the present disclosure.

The operation control unit 21 generates an inter-field route using the approximated straight line a2 and the approximated curve a3, based on the points p1 acquired during teaching traveling by the method described above. FIG. 20 illustrates an inter-field route A2 generated by the method described above. Thus, for an automatic traveling route, a smooth route of the work vehicle 10 with fewer unwanted behavior changes can be generated.

As described above, when the angle d1 between a first straight line that connects two points p1 and a second straight line that connects two points p1 is less than a threshold, the operation control unit 21 approximates the first straight line and the second straight line into one straight line, when the angle d1 is equal to or larger than the threshold, approximates the first straight line and the second straight line into one curve, and generates an inter-area route, based on the approximated straight line and the approximated curve.

Figure 21:
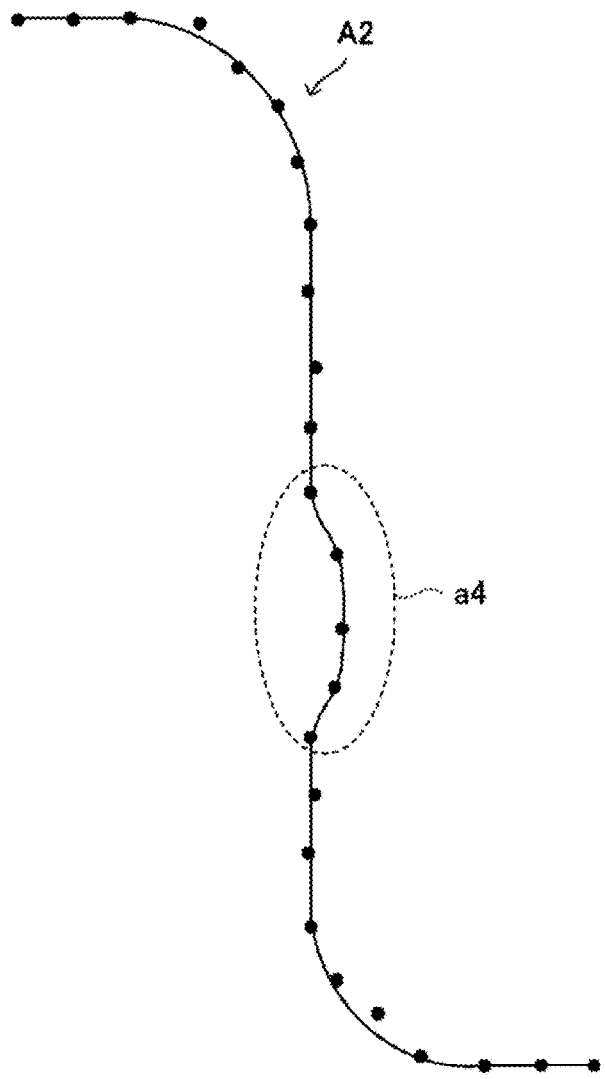
FIG. 21 is a view illustrating an example of the inter-field route for the work vehicle according to an embodiment of the present disclosure.
Figure 22:
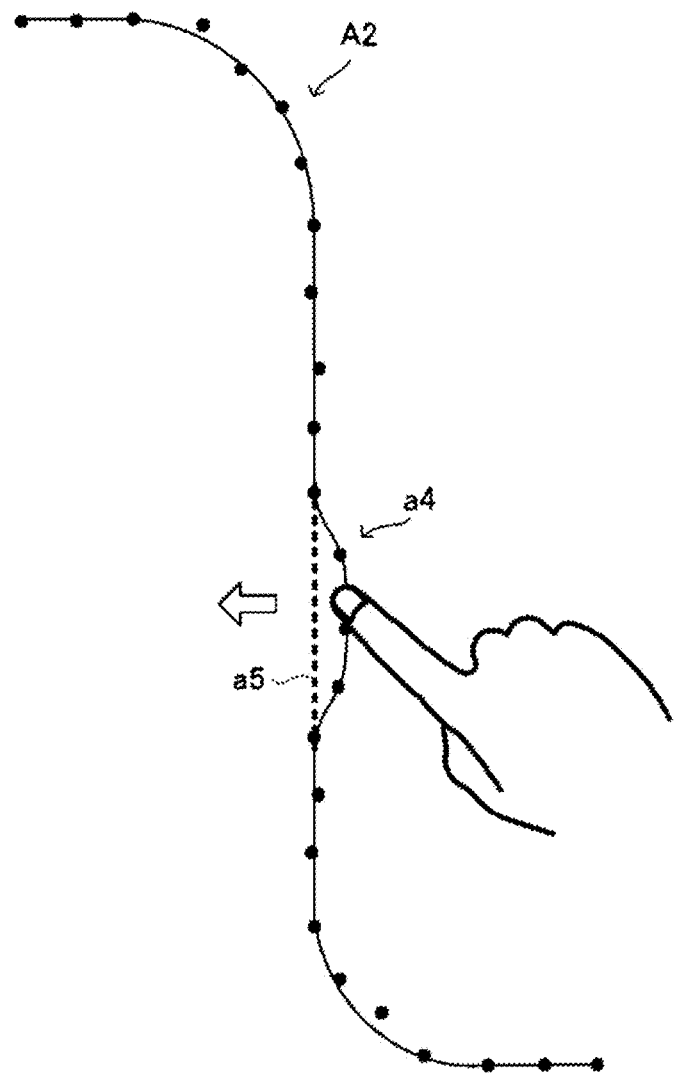
FIG. 22 is a view illustrating an example of an editing operation of the inter-field route for the work vehicle according to an embodiment of the present disclosure.

As still another embodiment, the operation control unit 21 may be capable of receiving an editing operation performed by the operator and may generate and change an inter-field route, based on the editing operation. For example, FIG. 21 illustrates an inter-field route A2 generated by the operation control unit 21. The inter-field route A2 includes a protruding route a4 that protrudes from a straight route (a route extending an up-down direction in FIG. 21). Herein, for example, the operator determines that the protruding route a4 is unnecessary and wishes to change the protruding route a4 to a straight route in some cases. In this case, the operator can perform an operation of removing the protruding route a4 on the teaching operation screen D2. For example, as illustrated in FIG. 22, when the operator touches (long-presses) the protruding route a4 with a finger, the protruding route a4 can be moved and, when the operator moves the finger to left and releases the finger near the straight route, the protruding route a4 is changed to a straight route a5. The operation control unit 21 changes the inter-field route A2 illustrated in FIG. 21 to the inter-field route A2 illustrated in FIG. 20 by the editing operation described above.

Note that, for example, the operation control unit 21 may be configured to display, when the operator touches the protruding route a4 with a finger in FIG. 22, a message inquiring whether the selected protruding route a4 is to be edited (deleted or the like). For example, the operation control unit 21 may be configured to delete, when the operator touches the points p1 corresponding to the protruding route a4 in FIG. 22, the position information of the points p1 and regenerate a route. Thus, the protruding route a4 is changed to the straight route a5, for example, by a deletion operation of deleting all the points p1 corresponding to the protruding route a4 by the operator.

Figure 23:
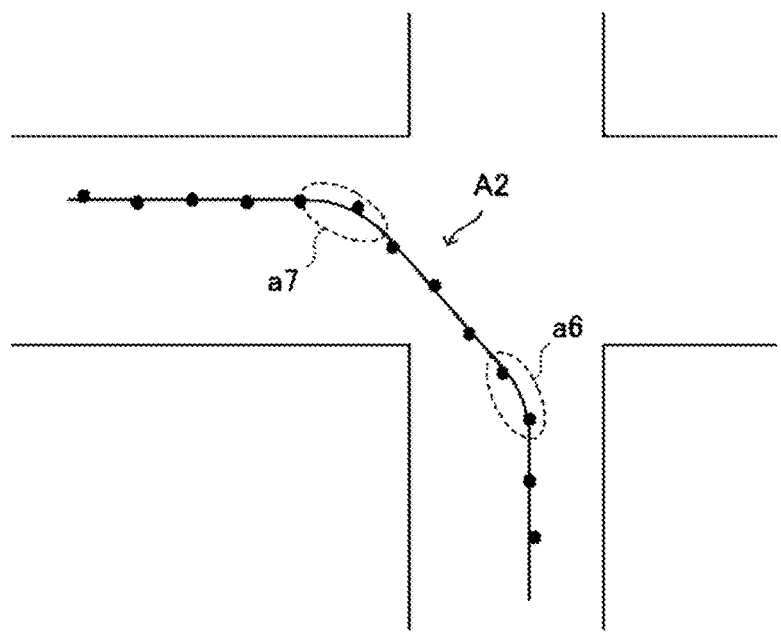
FIG. 23 is a view illustrating an example of an editing operation of the inter-field route for the work vehicle according to an embodiment of the present disclosure.
Figure 24:
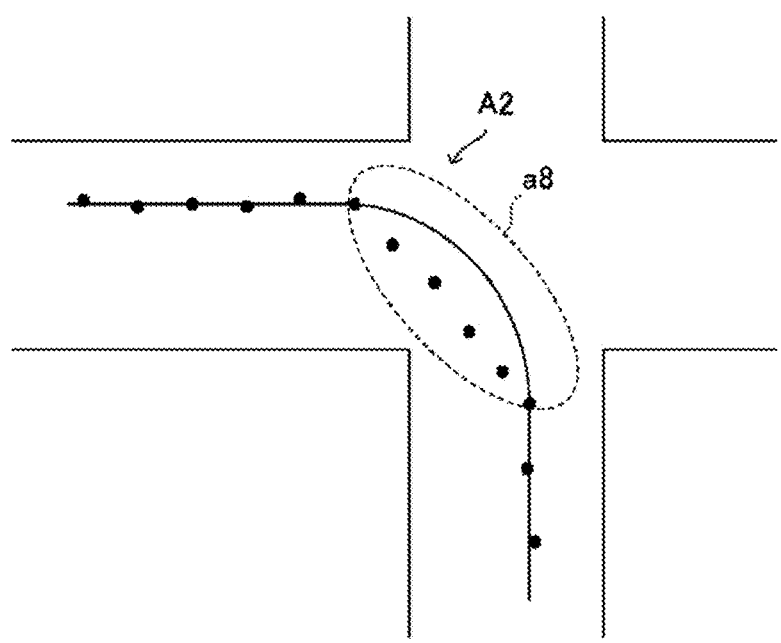
FIG. 24 is a view illustrating an example of an editing operation of the inter-field route for the work vehicle according to an embodiment of the present disclosure.

According to the editing operation described above, it is possible, for example, to change an inter-field route A2 illustrated in FIG. 23 to an inter-field route A2 illustrated in FIG. 24. Specifically, it is assumed that the inter-field route A2 illustrated in FIG. 23 has been generated by teaching traveling performed by the operator. The inter-field route A2 illustrated in FIG. 23 includes turning routes a6 and a7 each having a small turning radius. In this case, when the operator wishes to cause the work vehicle 10 to automatically travel on a gentle turning route with a large turning radius, the operator performs the editing operation described above. Thus, the operation control unit 21 changes the turning route to a turning route a8 with a large turning radius, as illustrated in FIG. 24.

Note that, in the editing operation described above, the operator can also change a straight route to a curved route.

The operation control unit 21 may be configured to set, when the route is changed, vehicle speed corresponding to a changed route. For example, when the operator changes a curved route to a straight route, the operation control unit 21 changes vehicle speed set for the curved route to speed corresponding to the straight route.

The operation control unit 21 may be also configured to generate and change an inter-field route, based on the road information. For example, when a route that turns to left is included in an intersection, as illustrated in FIG. 23, the operation control unit 21 changes the turning route to the turning route a8 with a large turning radius, as illustrated in FIG. 24. As described above, the operation control unit 21 may be configured to automatically generate an appropriate inter-field route, based on the road information, not relying on the route of teaching traveling performed by the operator. That is, the operation control unit 21 may be configured to generate an inter-field route, based on the position information of the work vehicle 10 and the road information.

As still another embodiment, the operation control unit 21 may be configured to change a target route set in a field, based on an editing operation performed by the operator. For example, the operation control unit 21 may be configured to change a curved portion of the target route generated for the field to a straight line, based on the editing operation performed by the operator, and may be configured to change a straight line portion of the target route generated for the field to a curve, based on the editing operation of the operator. For example, the operator performs an editing operation on the target route, based on information, such as a shape of the field, work contents of a work in the field, a condition of the field, or the like. The operation control unit 21 may be also configured to change the target route generated by teaching traveling performed by the operator in the field, based on the editing operation performed by the operator.

As still another embodiment, the operation control unit 21 may be configured to add the road information (for example, intersection information) to the generated inter-field route. Thus, for example, when automatically traveling on an inter-field route, the work vehicle 10 can temporarily stop or slow down at an intersection.

[Additional Remarks of the Invention]

Additional remarks below are a summary of the present disclosure extracted from the embodiments described above. Configurations and processing functions described in additional remarks below can be selected and combined as appropriate.

<Additional Remark 1>

A route generation method includes receiving a traveling operation performed by a user, acquiring position information of a work vehicle traveling on a connecting road that connects a first area and a second area, based on the traveling operation, and generating an inter-area route on which the work vehicle is caused to automatically travel between the first area and the second area, based on the position information.

<Additional Remark 2>

In the route generation method described in the additional remark 1, when, in a state where the work vehicle is located in a first predetermined area in the first area, an operation of starting the traveling operation is received from the user, a first end point that is one end point of the inter-area route is set, when, in a state where the work vehicle is located in a second predetermined area in the second area, an operation of finishing the traveling operation is received from the user, a second end point that is another end point of the inter-area route is set, and the inter-area route that connects the first end point and the second end point is generated.

<Additional Remark 3>

In the route generation method described in the additional remark 2, the first predetermined area is an exit/entrance through which the work vehicle exits from and enters the first area and the second predetermined area is an exit/entrance through which the work vehicle exits from and enters the second area.

<Additional Remark 4>

In the route generation method described in the additional remark 2 or 3, a first work route on which the work vehicle is caused to automatically travel is set in the first area, a second work route on which the work vehicle is caused to automatically travel is set in the second area, and a first interpolation route that connects a start point or an end point of the first work route and the first end point and a second interpolation route that connects a start point or an end point of the second work route and the second end point are generated.

<Additional Remark 5>

In the route generation method described in any one of the additional remarks 1 to 4, when an operation of selecting the first area and the second area is received from the user, as information to support the traveling operation, a guide route that connects the first area and the second rea is displayed on an operation terminal.

<Additional Remark 6>

In the route generation method described in any one of the additional remarks 1 to 5, whether to register the generated inter-area route is notified to the user, and when an instruction to register the inter-area route is acquired from the user, the inter-area route is registered in association with the first area and the second area.

<Additional Remark 7>

In the route generation method described in any one of the additional remarks 1 to 6, using at least a portion of the inter-area route, an inter-area route that connects a plurality of other areas is generated.

<Additional Remark 8>

In the route generation method described in any one of the additional remarks 1 to 7, each of the first area and the second area is a field, a supply area where a supply material is supplied to the work vehicle, a discharge area where a discharge material is discharged from the work vehicle, or a storage area for the work vehicle.

<Additional Remark 9>

In the route generation method described in any one of the additional remarks 1 to 8, when each of the first area and the second area is a field, the work vehicle is caused to automatically travel in the first area, then, is caused to automatically travel on the inter-area route from the first area to the second area, and thereafter, is caused to automatically travel in the second area.

<Additional Remark 10>

In the route generation method described in any one of the additional remarks 1 to 9, the inter-area route is generated based on a straight line and a curve that connect points indicated by the position information.

<Additional Remark 11>

In the route generation method described in the additional remark 10, when an angle between a first straight line that connects two of the points and a second straight line that connects two of the points is less than a threshold, the first straight line and the second straight line are approximated into one straight line and, when the angle is equal to or larger than the threshold, the first straight line and the second straight line are approximated into one curve, and the inter-area route is generated based on the approximated straight line and the approximated curve.

<Additional Remark 12>

In the route generation method described in any one of the additional remarks 1 to 11, when an editing operation of editing the generated inter-area route is received from the user, the inter-area route is changed in accordance with the editing operation.

<Additional Remark 13>

In the route generation method described in any one of the additional remarks 1 to 12, the inter-area route is generated based on the position information and information of the connecting road.

REFERENCE SIGNS LIST

1 Automatic traveling system
10 Work vehicle
11 Vehicle control device
20 Operation terminal
111 Traveling processing unit
211 Setting processing unit
212 Reception processing unit
213 Acquisition processing unit
214 Generation processing unit
215 Output processing unit
F1 Field (first field)
F2 Field (second field)
G1 Traveling end point (end point)
G2 Traveling end point (end point)
H1 Exit/entrance (first predetermined area)
H2 Exit/entrance (second predetermined area)
R0 Road (connecting road)
R1 Target route (first work route)
R2 Target route (second work route)
R12 Inter-field route (inter-area route)
S1 Traveling start point (start point)
S2 Traveling start point (start point)
Ts1 Route start point (first end point)
Te2 Route end point (second end point)
r31 Interpolation route (first interpolation route)
r32 Interpolation route (second interpolation route)
AR1 Supply area

The invention claimed is:

1. A route generation method comprising:
receiving a traveling operation performed by a user;
acquiring position information of a work vehicle traveling based on the traveling operation, the work vehicle traveling on a connecting road that connects a first area and a second area; and
generating, based on the position information, an inter-area route on which the work vehicle is caused to automatically travel between the first area and the second area.

2. The route generation method according to claim 1, further comprising:
in a state where the work vehicle is located in a first predetermined area in the first area, based on an operation of starting the traveling operation is received from the user, setting a first end point that is one end point of the inter-area route; and
in a state where the work vehicle is located in a second predetermined area in the second area, based on an operation of finishing the traveling operation is received from the user, setting a second end point that is another end point of the inter-area route, and
wherein the inter-area route connects the first end point and the second end point.

3. The route generation method according to claim 2, wherein:
the first predetermined area is an exit/entrance through which the work vehicle exits from and enters the first area, and
the second predetermined area is an exit/entrance through which the work vehicle exits from and enters the second area.

4. The route generation method according to claim 2, further comprising:
setting a first work route on which the work vehicle is caused to automatically travel in the first area;
setting a second work route on which the work vehicle is caused to automatically travel in the second area; and
generating:
a first interpolation route that connects a start point or an end point of the first work route and the first end point, and
a second interpolation route that connects a start point or an end point of the second work route and the second end point.

5. The route generation method according to claim 1, further comprising, based on an operation of selecting the first area and the second area is received from the user, displaying, as information to support the traveling operation, a guide route that connects the first area and the second area on an operation terminal.

6. The route generation method according to claim 1, further comprising:
notifying the user to indicate whether to register the generated inter-area route, and
based on receipt of an instruction to register the inter-area route from the user, registering the inter-area route in association with the first area and the second area.

7. The route generation method according to claim 1, further comprising generating, based on at least a portion of the inter-area route, an inter-area route that connects a plurality of other areas.

8. The route generation method according to claim 1, wherein each of the first area and the second area includes:
a field,
a supply area where a supply material is supplied to the work vehicle,
a discharge area where a discharge material is discharged from the work vehicle, or
a storage area for the work vehicle.

9. The route generation method according to claim 1, wherein, based on each of the first area and the second area being a field, the work vehicle is caused to:
automatically travel in the first area,
after travel in the first area, automatically travel on the inter-area route from the first area to the second area, and
after travel to the second area, automatically travel in the second area.

10. The route generation method according to claim 1, wherein the inter-area route is generated based on a straight line and a curve that connect points indicated by the position information.

11. The route generation method according to claim 10, wherein:
- based on an angle between a first straight line that connects two of the points and a second straight line that connects two of the points is less than a threshold, the first straight line and the second straight line are approximated into one straight line,
- based on the angle being equal to or larger than the threshold, the first straight line and the second straight line are approximated into one curve, and
- the inter-area route is generated based on the approximated straight line and the approximated curve.

12. The route generation method according to claim 10, further comprising, based on receipt from the user of an editing operation of editing the generated inter-area route, changing the inter-area route in accordance with the editing operation.

13. The route generation method according to claim 1, wherein the inter-area route is generated based on the position information and information of the connecting road.

14. A route generation system comprising:
- a reception processing unit configured to receive a traveling operation performed by a user;
- an acquisition processing unit configured to acquire position information of a work vehicle based on the traveling operation, the work vehicle traveling on a connecting road that connects a first area and a second area; and
- a generation processing unit configured to generate, based on the position information, an inter-area route on which the work vehicle is caused to automatically travel between the first area and the second area.

15. A route generation program that, when executed by one or more processors, causes the one or more processors to perform operations comprising:
- receiving a traveling operation performed by a user;
- acquiring position information of a work vehicle traveling based on the traveling operation, the work vehicle traveling on a connecting road that connects a first area and a second area; and
- generating, based on the position information, an inter-area route on which the work vehicle is caused to automatically travel between the first area and the second area.

* * * * *